US012800737B2

(12) United States Patent
Sakabe

(10) Patent No.: US 12,800,737 B2
(45) Date of Patent: Nov. 17, 2026

(54) LASER RADAR DEVICE PROVIDED WITH CIRCUITY FAILURE DETECTION

(71) Applicant: DENSO WAVE INCORPORATED, Chita-gun (JP)

(72) Inventor: Kouji Sakabe, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 561 days.

(21) Appl. No.: 18/373,636

(22) Filed: Sep. 27, 2023

(65) Prior Publication Data

US 2024/0111035 A1 Apr. 4, 2024

(30) Foreign Application Priority Data

Oct. 4, 2022 (JP) ................................. 2022-160500

(51) Int. Cl.
*G01S 7/497* (2006.01)
*G01S 13/10* (2006.01)

(52) U.S. Cl.
CPC .............. *G01S 7/497* (2013.01); *G01S 13/10* (2013.01)

(58) Field of Classification Search
None
See application file for complete search history.

(56) References Cited

U.S. PATENT DOCUMENTS

2020/0110259 A1* 4/2020 Pastor .................... G01S 7/4817

FOREIGN PATENT DOCUMENTS

JP 2006-349449 A 12/2006
JP 2019-090679 A 6/2019

* cited by examiner

*Primary Examiner* — Luke D Ratcliffe
(74) *Attorney, Agent, or Firm* — Oliff PLC

(57) ABSTRACT

In a laser radar device, a light projector projects a laser beam to both a detection area outside the device and a reference optical member located inside the device. A light receiver receives a reflected light of the laser beam, converts the reflected light to an electrical received light waveform. A detection unit detects an object in the detection area based on the received light waveform. A determination unit obtains an electrical reference received light waveform from the light receiver by making the light projector project the laser beam to the reference optical member, at a first time and a second time elapsing from the first time. The determination unit further calculates a degree of changes between the reference received light waveforms acquired at the first and second times, and determines whether there is caused a failure in circuitry, based on the degree of changes.

10 Claims, 13 Drawing Sheets

LASER RADAR DEVICE PROVIDED WITH CIRCUITY FAILURE DETECTION

CROSS-REFERENCE TO RELATED APPLICATION

This application is based on and claims the benefit of priority from earlier Japanese Patent Application No. 2022-160500 filed Oct. 4, 2022, the description of which is incorporated herein by reference.

BACKGROUND

Technical Field

The present invention relates to a laser radar device, and in particular, to a laser radar device that scans a laser beam and receives reflected light, and detects objects based on the received reflected light, during which scanning the laser beam is projected for detecting a failure which may be caused in circuitry of the laser radar device.

Related Art

Conventionally, in the laser radar device of this type, there is known a laser radar device that measures a reference length corresponding to a distance to a light guiding member fixed in the casing of the laser radar device, and to calibrate a distance to a measured object based on the reference length (see Patent Document 1). The reference length changes in response to changes in the measurement environment, such as ambient temperature conditions, or changes in the age of the component. Therefore, according to the disclosure in Patent Document 1, it is taught that if the distance to an object is calibrated based on this amount of changes, it is possible to always perform proper distance measurement regardless of changes in the surrounding measurement environment.

PRIOR ART REFERENCE

Patent Documents

[Patent Reference 1] JP 2006-349449 A

Problems to be Solved

By the way, laser radar devices measure a distance to an object using the TOF (Time Of Flight) method based on a received light waveform, which is an electrical signal converted from the reflected light received. A received light waveform acquired when a distance to the reference optical member is measured (hereinafter referred to as "reference received light waveform") varies due to changes in temperature and failures in the circuitry of the laser radar device. Therefore, it is convenient to observe the reference received light waveform for changes in temperature and fault detection. For example, if the wave height of the reference received light waveform is larger than a threshold, such a case can be judged as occurrence of a failure. However, in this method, it is necessary to avoid misjudging a change in wave height due to changes in temperature as occurrence of a failure. This requires that the threshold be set large, but this may delay the detection of failures. In this case, an intruder that has entered the danger zone may be put in a state where the intruder cannot be detected for a long time, which is inconvenient to the guard system.

SUMMARY

Thus it is desired to quickly detect circuit failures in a laser radar device, based on the reference received light waveform acquired in the reference optical member installed fixedly in the device housing.

According to a first exemplary embodiment of the disclosure, there is provided a laser radar device, including: a light projector that projects a laser beam to both a detection area which is present outside the laser radar device and a reference optical member located at a fixed position, which fixed position is, for example, located inside the casing of the laser radar device. This laser radar device further includes a light receiver that receives a reflected light of the laser beam projected from the light projector, converts the reflected light to, as an electric signal, a received light waveform, and outputs the received light waveform; and a detection unit configured to detect an object based on the received light waveform outputted from the light receiver. In addition, this laser radar device further includes an obtaining unit configured to obtain an electrical reference received light waveform which is outputted from the light receiver by making the light projector project the laser beam to the reference optical member, at a first time and a second time elapsing from the first time; a calculation unit configured to calculate a degree of changes between the reference received light waveforms acquired by the acquisition unit at the first and second times; and a determination unit configured to determine that at least one of the light projector, the light receiver, and the detection unit is failed, based on the degree of changes obtained by the obtaining unit.

The detection unit detects objects based on the received light waveforms outputted by the light receiver. Thus, like the normally available laser radar device, the laser radar device is able to detect intruders and suspicious objects that have entered the detection area.

In addition to the foregoing radar operation, the determination unit acquires reference received light waveforms outputted by the light receiver when the laser beam is projected toward the reference optical member by the light projector. The reference received light waveform varies due to changes in temperature and/or failure of the circuitry of the laser radar device. In such changes, changes in the reference received light waveforms due to changes in temperature in the circuit are continuous, while changes in the reference received light waveforms due to circuit failure are beyond a degree of changes due to the temperature changes.

In consideration of the foregoing, the determination unit uses the first and second times (time instants) to determine the failure of the circuitry of at least one of the light projector, the light receiver, and the detection unit, based on a degree of changes in the two reference received light waveforms obtained at the two different time instants. Thus, even before the reference received light waveform changes significantly due to a circuit failure, it is possible to detect signs of a circuit failure based on such a degree of changes in the reference received light waveforms obtained at the different times. Thus, by the laser radar device, circuit failures can be quickly detected based on the reference received light waveforms. This can prevent an intruder from entering the detection area or from being in the detection area for a long time without the detection thereof, and thus can prevent the intruder from being placed in a dangerous state.

Generally, a laser radar device detects intruders, etc. that have entered a detection area by projecting a laser beam at a predetermined period (e.g., 30-70 ms) into the detection area.

In a second exemplary embodiment in the present disclosure, there is provided a laser radar device which includes a light projector and a light receiver, which are configured identically to those defined in the foregoing exemplary embodiment, and also includes a processor, incorporated in a computer system installed in the laser radar device. The processer reads a previously set program from a memory in the computer system and enabling the computer system to: detect an object based on the received light waveform outputted from the light receiver; obtain an electrical reference received light waveform which is outputted from the light receiver by making the light projector project the laser beam to the reference optical member, at a first time and a second time which is later the first time; calculate a degree of changes between the reference received light waveforms acquired at the first and second times; and determine that at least one of the light projector, the light receiver, and the detection unit is failed, based on the degree of changes obtained.

In a third exemplary embodiment in the present disclosure, there is also provided a method of detecting a failure caused in the laser radar device. The laser radar device is provided with a light projector that projects a laser beam to both a detection area which is present outside the laser radar device and a reference optical member located at a fixed position inside the laser radar device; a light receiver that receives a reflected light of the laser beam projected from the light projector, converts the reflected light to, as an electric signal, a received light waveform, and outputs the received light waveform; and a processor, incorporated in a computer system installed in the laser radar device, the processer reading a previously set program from a memory in the computer system. The processor enables the computer system to perform the method of steps of: detecting an object based on the received light waveform outputted from the light receiver; obtaining an electrical reference received light waveform which is outputted from the light receiver by making the light projector project the laser beam to the reference optical member, at a first time and a second time which is later the first time; calculating a degree of changes between the reference received light waveforms acquired at the first and second times; and determining that at least one of the light projector, the light receiver, and the detection unit is failed, based on the degree of changes obtained.

Hence, according to the first and second exemplary embodiments, there are provided various advantages which are similar to those provided in the first embodiment.

Other operations and advantages will be explained in detail in the following embodiments and their modifications, which are explained together with the accompanying drawings.

DETAILED DESCRIPTION OF THE PREFERRED EMBODIMENTS

Various embodiments of the present disclosure will now be described below with reference to the accompanying drawings.

First Embodiment

The first embodiment embodied in a laser radar device that monitors intrusion of persons or substances into a danger zone which is set as a detection area is described below, with reference to FIG. 1 to FIG. 10. It is intended to mean that the danger zone itself is dangerous to people or substances or an owner of the zone prohibits people or substances from entering the zone. In any case, the laser radar device monitors the detection area such as the danger zone if persons or substances enter the area or exist in the area.

Figure 1:
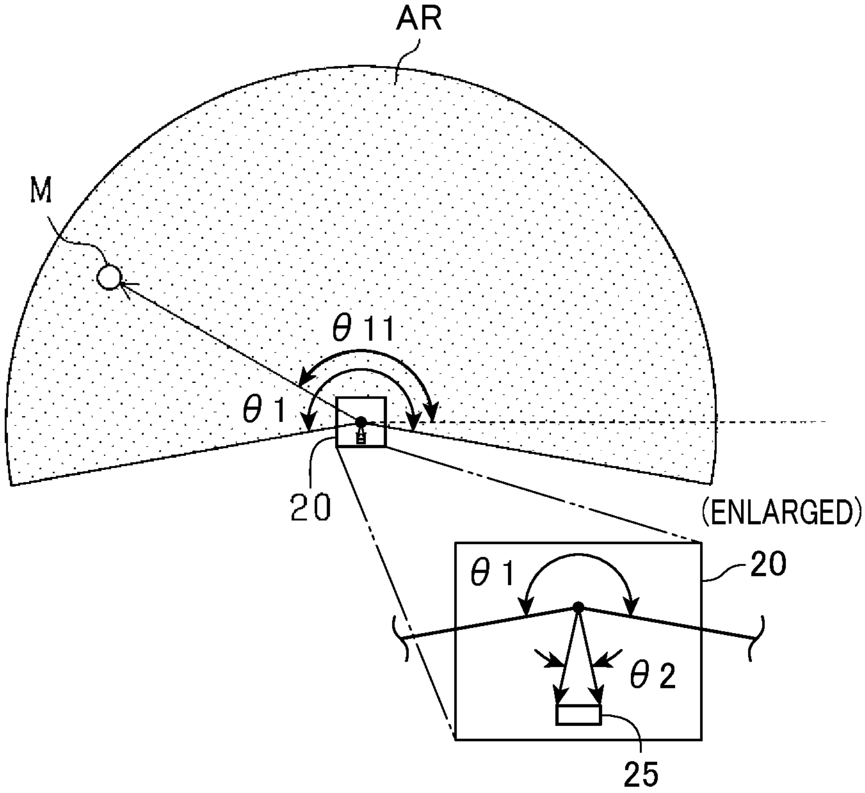
FIG. 1 is a plan view outlining a laser radar device.

As shown in FIG. 1, a laser radar device 20 is a wide-angle ranging radar that scans horizontally, with a laser beam, for example, a detection area AR of 190° (scanning angle θ1) which is present in front of the radar. The detection area AR is an area which is laser-searched for checking whether there is a risky object or a suspicious person therein. The laser radar device 20, when viewed in a planar view thereof, projects a pulsed laser beam radially onto the detection area AR, scans it, and detects objects which may be present in the detection area AR, based on the light-receiving state in which the laser beam receives reflected light reflected by the objects. For example, if an intruder M exists in the direction of light projection angle θ11 from the laser radar device 20 in the detection area AR, the distance from the laser radar device 20 to the intruder M is calculated. This detects the intruder M. For example, infrared lasers, visible lasers, ultraviolet lasers, etc. can be used as the laser beam.

Figure 2:
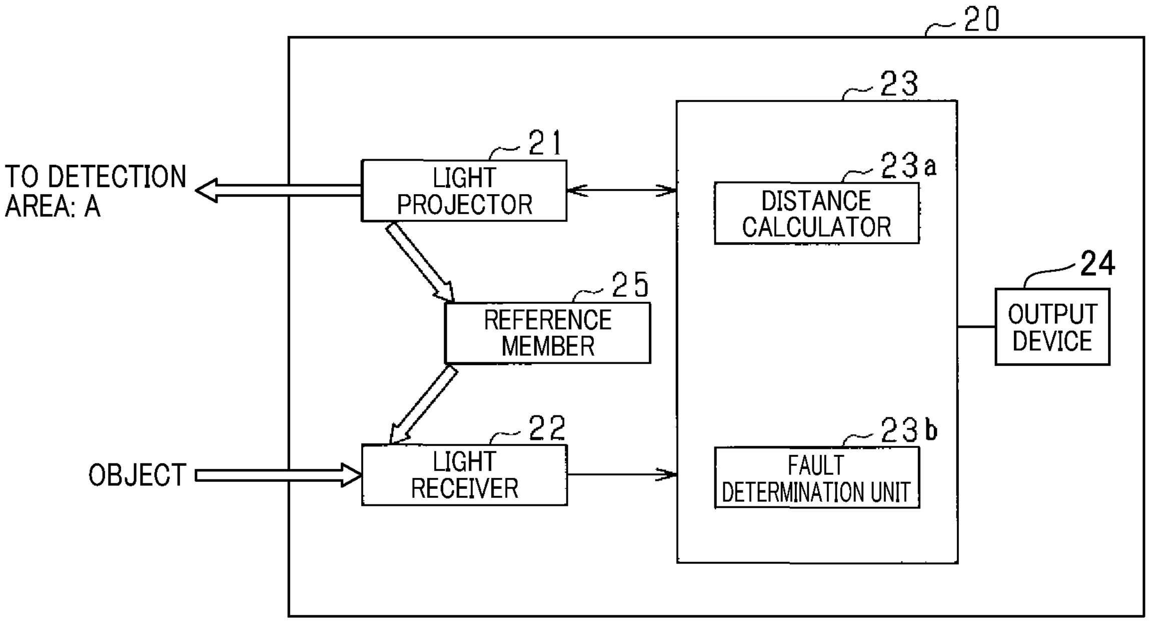
FIG. 2 is a block diagram showing an outlined and pictorial configuration of the laser radar device.

As shown in FIG. 2, the laser radar device 20 is equipped with a light projector 21, a light receiver 22, a microcomputer 23 serving as a processor, an output device 24, a reference optical member 25, and other necessary devices.

The microcomputer 23, that is, a processor, is equipped with known components including a CPU 231 serving as a main calculator, a ROM 232, a RAM 233 storing therein temporal data processed by the CPU 231, in addition to a clock generator 234, a memory device 235 and an I/O interface 236 communicably connected by a communication bus 237 in the microcomputer 23. The ROM 232 is configured to previously store therein various data of programs necessary for operating the laser radar device 20 and serve as a memory device assigned to a non-transitory computer readable medium for a fault determination according to the current disclosure. The data of programs memorized in the ROM 232 include data of a program for the fault determination later described (see FIG. 3, steps S1 to S4). The memory device 235 can also memorize various types of data and information, so that the memory device 235 can also be in charge of the non-transitory computer readable medium.

Figure 3:
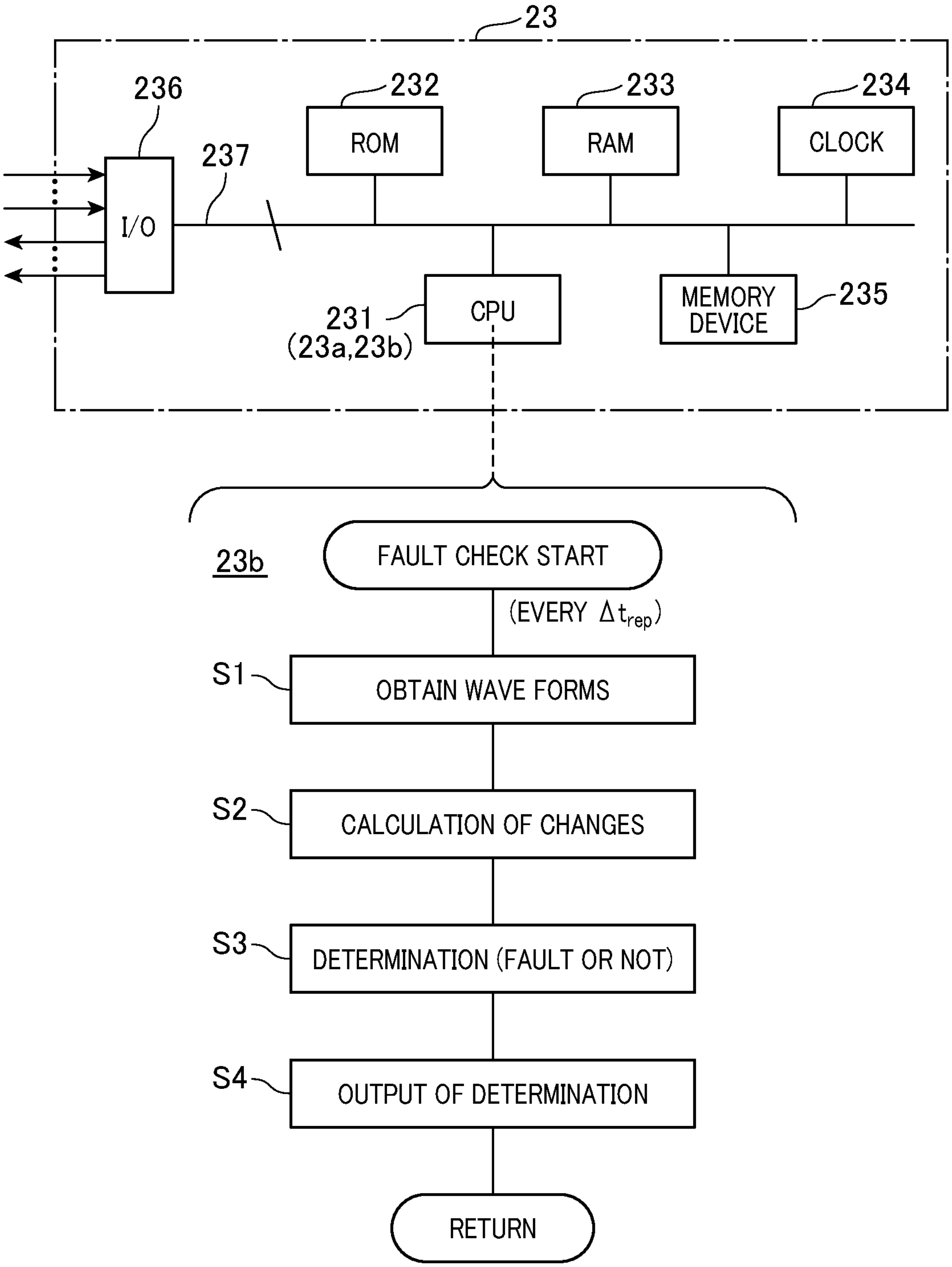
FIG. 3 is a block diagram of a computer system which is employed by the embodiments and a flowchart outlining processes executed by a CPU (a processor) installed in the computer system.

Hence, when the CPU 231 reads program data from the ROM 232 and executes the programs, the microcomputer 23 (processor) realizes the functions of a known distance calculator 23*a* and a fault determination unit 23*b* dedicated to a process for the fault determination performed in the various embodiments and modification of the disclosure, which is summarized as a outlined set of steps S1 to S4 shown in FIG. 3.

The output device 24 responses to an instruction issued from the CPU 231, that is, the fault determination unit 23*b*, which is a functional unit functionally realized by the steps S1 to S4 shown in FIG. 3, and informs users of the results of the fault determination.

The light projector 21 projects pulsed laser beams (indicated by white arrows) radially in a horizontal direction centered on the light projector 21, at a height corresponding to the statistically calculated a height of the human waists (predetermined height), at predetermined angular intervals (e.g., 0.25° intervals). In detail, the light projector 21 uses a motor to rotate a deflecting mirror that reflects the laser beam in the horizontal direction. This rotation changes the light projection angle θ of the laser beam. The rotation cycle of the motor, i.e., the scan cycle Tsc (corresponding to a predetermined cycle) for scanning the detection area AR with the laser beam, can be selectively set to 30 [ms] or 70 [ms], for example.

The light projector 21 is configured to scan for failure determination outside the range of the light projection angle θ1 in addition to the scanning of the range of the light projection angle θ1 described above during one rotation of the motor.

In other words, inside the casing of the laser radar device 20, there is provided with a reference optical member 25 that is fixed (installed) in its place (at the fixed position). Therefore, the laser radar device 20 projects a laser beam (indicated by the white arrow) toward the reference optical member 25. In detail, during one rotation of the motor, the deflecting mirror of the light projector 21 reflects the laser beam toward the reference optical member 25 located in a different direction from the detection area AR (i.e., at a predetermined angle θ2 outside the light projection angle θ1). As a result, the light projector 21 also projects a laser beam to reference optical member 25 every time the motor makes one rotation (i.e., every scan cycle Tsc). The reference optical member 25 is formed by a light guiding or reflecting member such as a prism or mirror. When the mirrors are used, for example, two mirrors are placed relative to each other, each inclined at 45 degrees. As a result, the laser beam projected from the light projector 21 propagates spatially through the reference optical member 25 inside the casing of the laser radar device 20 and returns to the light receiver 22. The distance from the light projector 21 to the reference optical member 25 is known.

The light receiver 22 receives the reflected light (indicated by the white arrow) reflected by the object from the laser beam projected by the light projector 21, converts the amount of received light into a voltage signal (electrical signal), and outputs it as the received waveform Vs [V]. The light receiver 22 outputs the received waveform Vs each time the laser beam is projected by the light projector 21. Hereafter, the received waveform Vs, which is output by the light receiver 22 after the laser beam is projected toward the reference optical member 25 by the light projector 21, is referred to as an "internal waveform" in the sense of a waveform that propagates spatially inside the device casing. The internal waveform (This internal waveform is also called the reference received waveform because it is used as a criterion for failure determination as described below.) is output by light receiver 22 at each scan cycle Tsc of the laser beam by the light projector 21.

A distance calculator 23*a* calculates the distance D from the light projector 21 to the object for each light projection direction in proportion to the elapsed time tx from the time the laser beam is projected by the light projector 21 until the reflected light is received by the light receiver 22 (TOF method). That is, the distance calculator 23*a* detects objects based on the received waveform Vs output by the light receiver 22. Here, the distance calculator 23*a* calculates the pulse width tt [s], which is the time that the received waveform Vs (intensity of the received waveform) output by the light receiver 22 exceeds the threshold value Vr1 [V] (first threshold). The time ti1 when the received waveform Vs exceeds the threshold value Vr1 is set to the time ti2 when the reflected light is received by the light receiver 22, which is set back by the correction amount Δtx based on the pulse width tt. For example, the wider the pulse width tt is, the smaller the correction amount Δtx is. Then, the distance calculator 23*a* takes the time from the time when the laser beam was projected by the light projector 21 to the time ti2 as the elapsed time tx.

The CPU 231 operates as the fault determination unit 23*b* (determination unit) such that the CPU 231 obtains the foregoing internal waveforms (Step S1 in FIG. 3). And the CPU 231 calculates a degree of changes between the internal waveform acquired at a first time (a first time instant) and the internal waveform acquired at a second time (a second time instant) which is after the first time by a predetermined time of period (step S2 in FIG. 3). Based on the degree of changes which has been calculated, the CPU 231 determines that at least one of the light projector 21, the light receiver 22, and the distance calculator 23*a*, which function as electronic circuits, has failed (step S3 in FIG. 3). By the CPU 231, a report showing the failure is outputted via the output circuit 24 to the operator (step S4 in FIG. 3). The foregoing processes shown in steps S1 to S4 are repeated at each predetermined cycle $\Delta t_{rep}$, which is, for example, set to be the scan cycle Tsc.

In this example, step S1 in FIG. 3 corresponds to an obtaining unit functionally realized, step S2 corresponds to a calculation unit functionally realized, and step S3 corresponds to a determination unit functionally realized.

Figure 4:
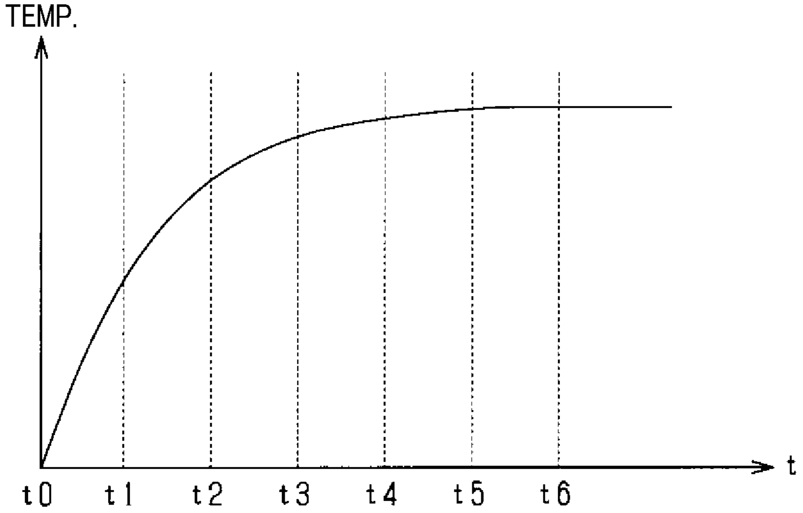
FIG. 4 is a graph showing a relationship between temperature measured inside the housing of the laser radar device and elapsed time.

FIG. 4 shows the relationship between time t and the temperature inside the casing. The temperature inside the casing (i.e., the temperature of the electronic circuit) begins to rise immediately after turning on the power of the laser radar device 20 (activating the laser radar device 20) at time t0. The temperature inside the casing rises rapidly (abruptly) from time t0 to t1 (the predetermined time immediately after activating the laser radar device 20), somewhat rapidly from time t1 to t2, and slowly from time t2 to t6.

Figure 5:
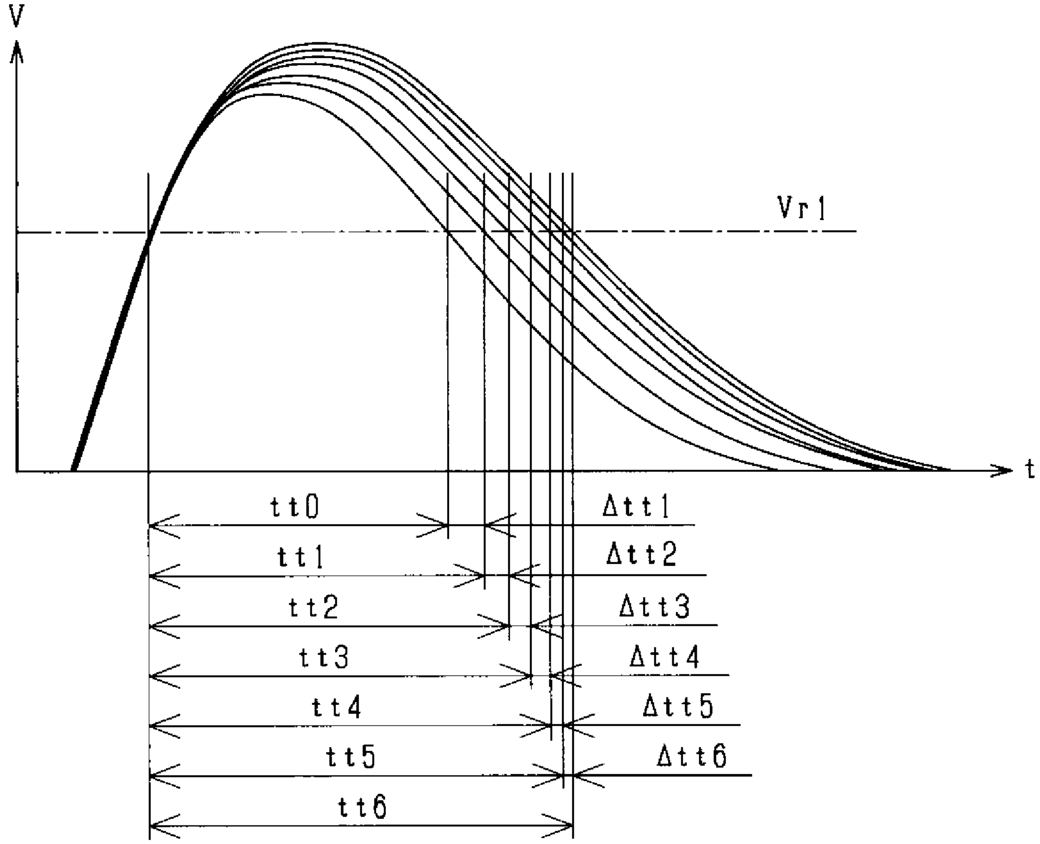
FIG. 5 is a graph showing changes of internal light waveforms and elapsed time.

FIG. 5 shows the relationship between time t and the change in internal waveform. The pulse width tt0 to tt6 represent the pulse width tt of the internal waveform acquired at time t0 to t6 in FIG. 4, respectively. The pulse width tt of the internal waveform is wider as the temperature inside the casing of the laser radar device increases, so the pulse width tt of the internal waveform acquired at a later time is wider. The temperature change Δtt of the pulse width tt of the internal waveform is the absolute value of difference between the pulse width tt of the internal waveform acquired in the previous period and the pulse width tt of the internal waveform acquired in the current period. For example, the temperature change Δtt1 is the absolute value of difference between the pulse width tt1 of the internal waveform acquired at time t1 and the pulse width tt0 of the internal waveform acquired at time t0. Also, the temperature change Δtt of the pulse width tt of the internal waveform is as wide as the temperature change Δtt between the two internal waveforms obtained at an earlier time.

Hence, there is a failure determination value Δts which is an assumed temperature change Δtt12 (a predetermined temperature change) plus an error amount "ar" as the temperature change in the internal waveform due to temperature change inside the casing from the first time to the second time during the predetermined time (time period t0 to t1) immediately after the power supply in the laser radar device 20 is turned on. The temperature change Δtt12 is the value obtained by converting the assumed temperature change Δtt1 as the temperature change in the internal waveform due to temperature change inside the casing from period t0 to period t1 to the temperature change in a laser beam scan cycle Tsc. If the temperature change Δtt due to continuous changes in temperature inside the casing of the laser radar device 20, the failure determination value Δts should not be exceeded, and the fault determination unit 23*b* determines that the electronic circuit is normal.

Then, the distance calculator 23*a* calibrates (corrects) the calculated distance from the light projector 21 to the object based on the deviation between the known distance from the light projector 21 to the reference optical member 25 and the distance from the light projector 21 to the reference optical member 25 calculated based on internal waveform.

On the other hand, the fault determination unit 23*b* determines that the electronic circuit has failed if the temperature change Δtt exceeds the failure determination value Δts. That is, the fault determination unit 23B determines that the amount of changes Δtt provided between the internal light waveform acquired at the first time and the internal light waveform acquired at the second time exceeds an amount of changes Δtt12. This amount of changes Δtt12 is estimated and set as an amount of changes in the internal light waveform caused by changes in temperature in the electronic circuit (inside the casing) during a period of time from the first time to the second time immediately after the laser radar device 20 is turned on. If this determination shows the temperature change, the electronic circuit is determined to have failed. The fault determination unit 23*b* then outputs the failure of the electronic circuit to the outside world via the output device 24, displays it on a display unit, or issues an alarm to the alarm system. This prevents the distance D to the object from being calculated by the distance calculator 23*a* or the measurement error of the distance D from continuing to increase.

Figure 6:
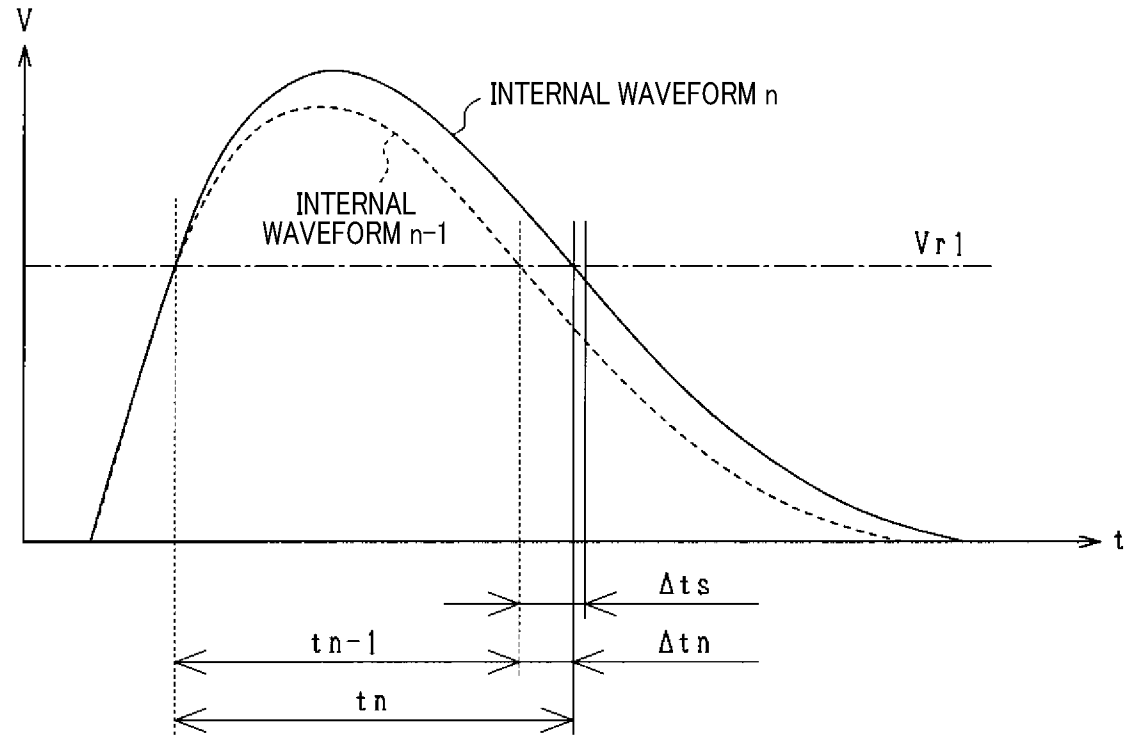
FIG. 6 is a graph exemplifying an internal light waveform acquired last time and an internal light waveform acquired currently in the normal state in a first embodiment.

FIG. 6 shows an example of the previous internal waveform n−1 and the current internal waveform n under normal the conditions. The current internal waveform n is larger than the previous internal waveform n−1 in this example. Then, the temperature change Δtn between pulse width tn (second waveform width), which is the time exceeding threshold value Vr1 in the current internal waveform n, and pulse width tn−1 (first waveform width), which is the time exceeding threshold value Vr1 in the previous internal waveform n−1, is smaller than the failure determination value Δts. Therefore, the fault determination unit 23*b* determines that the electronic circuit is normal (not be faulted). The previous internal waveform n−1 and the current internal waveform n exceed threshold value Vr1 at the same time, but these times are not necessarily simultaneous (as in subsequent examples).

Figure 7:
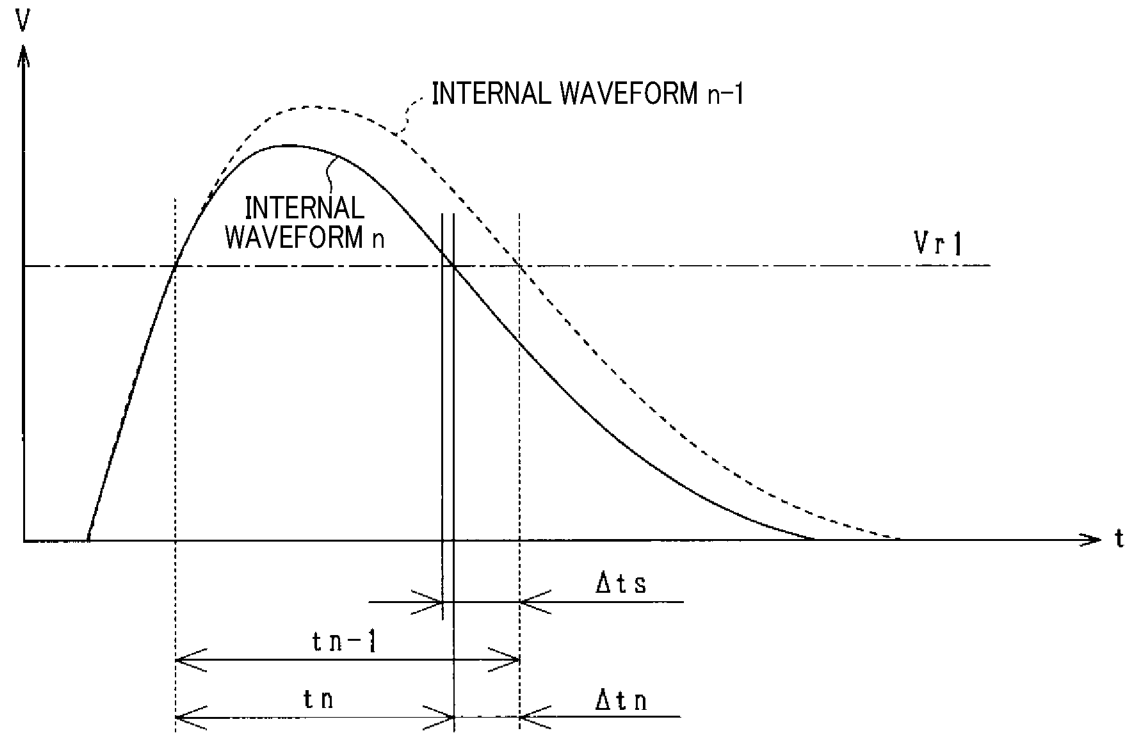
FIG. 7 is another graph exemplifying an internal light waveform acquired last time and an internal light waveform acquired currently in the normal state in the first embodiment.

FIG. 7 shows other examples of previous internal waveform n−1 and current internal waveform n under normal conditions. In this example, the current internal waveform n is smaller than the previous internal waveform n−1. The temperature change Δtn (absolute value of difference) between the pulse width tn in the current internal waveform n and the pulse width tn−1 in the previous internal waveform n−1 is smaller than the failure determination value Δts. Therefore, the fault determination unit 23*b* determines that the electronic circuit is normal (that is, not be faulted).

Figure 8:
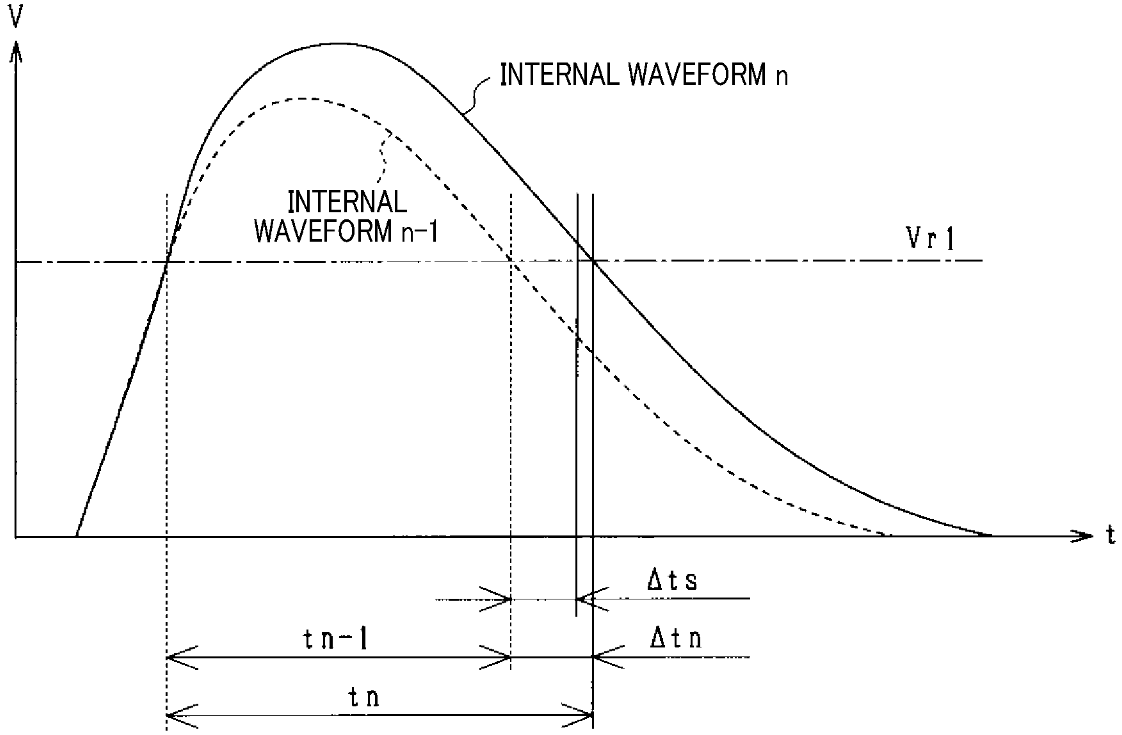
FIG. 8 is a graph exemplifying an internal light waveform acquired last time and an internal light waveform acquired currently in a failed state in the first embodiment.

FIG. 8 shows an example of the previous internal waveform n−1 and the current internal waveform n in a state where a failure has been caused. In this example, the current internal waveform n is larger than the previous internal waveform n−1. The temperature change Δtn (absolute value of difference) between the pulse width tn in the current internal waveform n and the pulse width tn−1 in the previous internal waveform n−1 is larger than the failure determination value Δts. Therefore, the fault determination unit 23*b* determines that the electronic circuit is faulty.

Figure 9:
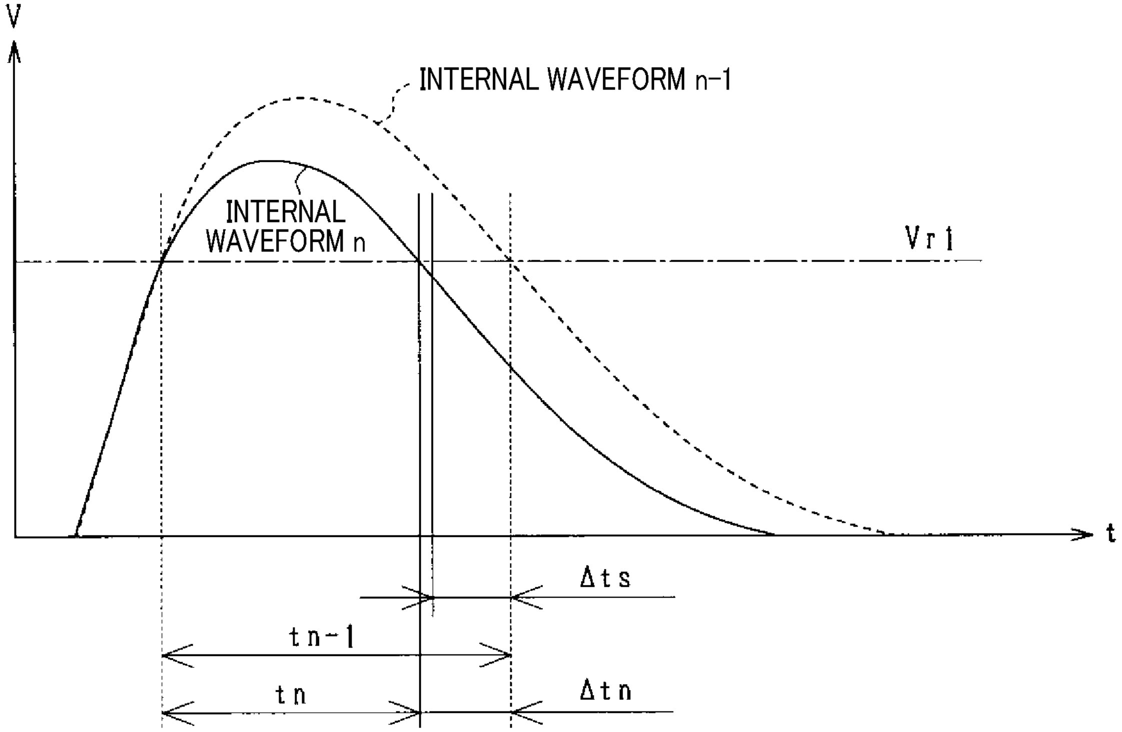
FIG. 9 is another graph exemplifying an internal light waveform acquired last time and an internal light waveform acquired currently in a failed state in the first embodiment.

FIG. 9 shows another example of the previous internal waveform n−1 and current internal waveform n in a state where a failure has been caused. In this example, the current internal waveform n is smaller than the previous internal waveform n−1. The temperature change Δtn (absolute value of difference) between the pulse width n in the current internal waveform n and the pulse width tn−1 in the previous internal waveform n−1 is larger than the failure determination value Δts. Therefore, the fault determination unit 23 determines that the electronic circuit is faulty.

The present embodiment which has been detailed above has the following advantages.

The fault determination unit 23*b* determines that an electronic circuit, which is at least one of the devices including the light projector 21, the light receiver 22, and the distance calculator 23*a*, has failed based on the temperature change Δtn between internal waveform n−1 acquired at the first time and internal waveform n acquired at the second time after the first time. Therefore, even before the internal waveform changes significantly due to an electronic circuit failure, the system can detect the signs of a large change in internal waveform and determine that an electronic circuit has failed based on the temperature change Δtn between internal waveform n−1 in the first time and internal waveform n in the second time. Electronic circuit failures can be detected quickly based on the internal waveform in the laser radar device 20. It is possible to reduce the continued inability to detect the intruder M that has entered the detection area AR and to reduce the intruder M from being put in a dangerous state.

The light projector 21 projects a laser beam at scan cycle Tsc toward the reference optical member 25 and the detection area AR, and the interval between the first time and the second time is scan cycle Tsc. According to this configuration, the fault determination unit 23*b* determines that an electronic circuit has failed based on the temperature change Δtn of internal waveform in the scan cycle Tsc that projects the laser beam on the reference optical member 25 and the detection area AR. Therefore, the signs of a large change in the internal waveform can be quickly detected to determine that an electronic circuit has failed, and electronic circuit failures can be detected even more quickly.

The temperature change Δtn in pulse width tt corresponds to a temperature change between the pulse width tn−1, which is the time when the intensity of internal waveform n−1 exceeds threshold value Vr1, acquired in the first time, and the pulse width tn, which is the time when the intensity of internal waveform n exceeds threshold value Vr1, acquired in the second time. According to this configuration, the temperature change Δtn between internal waveform n−1 acquired at the first time and internal waveform n acquired at the second time can be calculated, using a function generally provided by the laser radar device 20 which employs the TOF method.

The fault determination unit 23*b* determines that the electronic circuit has failed if the temperature change Δtn provided between the internal waveform n−1 obtained at the first time and the internal waveform n obtained at the second time exceeds the temperature change Δtt12, which is assumed as a temperature change Δtn of the internal waveforms, which is caused due to temperature changes in the electronic circuit in a period of time starting from the first time to the second time in the predetermined duration (time t0 to t1) provided immediately after starting the laser radar device 20.

Therefore, it is possible to quickly determine that an electronic circuit has failed while suppressing misjudgment that an electronic circuit has failed. Furthermore, there is no need to change the failure determination value Δts according to the timing of failure determination, and the determination process can be simplified.

The first embodiment may be implemented with the following modifications. The parts or components which provides the same functions as those shown in the first embodiment will be omitted from the explanation with the same reference numbers or symbols.

The ratio of pulse width tn to pulse width tn−1, "(tn/tn−1)", can be used as the temperature change Δtn provided between the internal waveform n−1 acquired at the first time and the internal waveform n acquired at the second time. In this case, the failure determination value Δts should be changed according to a change in the temperature changes Δtn in the ratio provided between the pulse width tn and the pulse width tn−1.

Instead of pulse width tn−1, which is the time when the intensity of internal waveform n−1 acquired in the first time exceeds threshold value Vr1, the area Sn−1 of the region bounded by the portion exceeding threshold value Vr1 and threshold value Vr1 in the internal waveform n−1 can be adopted. Instead of pulse width tn, which is the time when the intensity of internal waveform n acquired in the second time exceeds threshold value Vr1, the area Sn of the region bounded by the portion exceeding threshold value Vr1 and threshold value Vr1 in the internal waveform n can also be employed. Based on the temperature change ΔSn (i.e., degree of changes) provided between an area Sn and an area Sn−1, it can also be determined that the electronic circuit has failed. In this case, the failure determination value ΔSs should be set according to a change in the areas Sn−1 and Sn, which is caused due to changes in temperature inside the casing of the laser radar device 20.

Second Embodiment

A second embodiment will now be described below with reference to FIGS. 10 to 13, with focusing on differences from the first embodiment. The same or equivalent parts or components as or to those explained in the first embodiment will be omitted from the explanation, with still using the same reference numbers or symbols.

In the second embodiment, the fault determination unit 23*b* is configured to determine that an electronic circuit has failed, based on the amount of change per unit time Δt/s between pulse width to, which is the time when the intensity of internal waveform s0 exceeds a threshold value Vr1, acquired at the first time, and pulse width t1, which is the time when the intensity of internal waveform s1 exceeds the threshold value Vr1, acquired at the second time. In this case, the failure determination value Δts/s should be set according to a change between the pulse widths t0 and t1 per unit time, which is due to changes in temperature inside the casing of the laser radar device 20.

Figure 10:
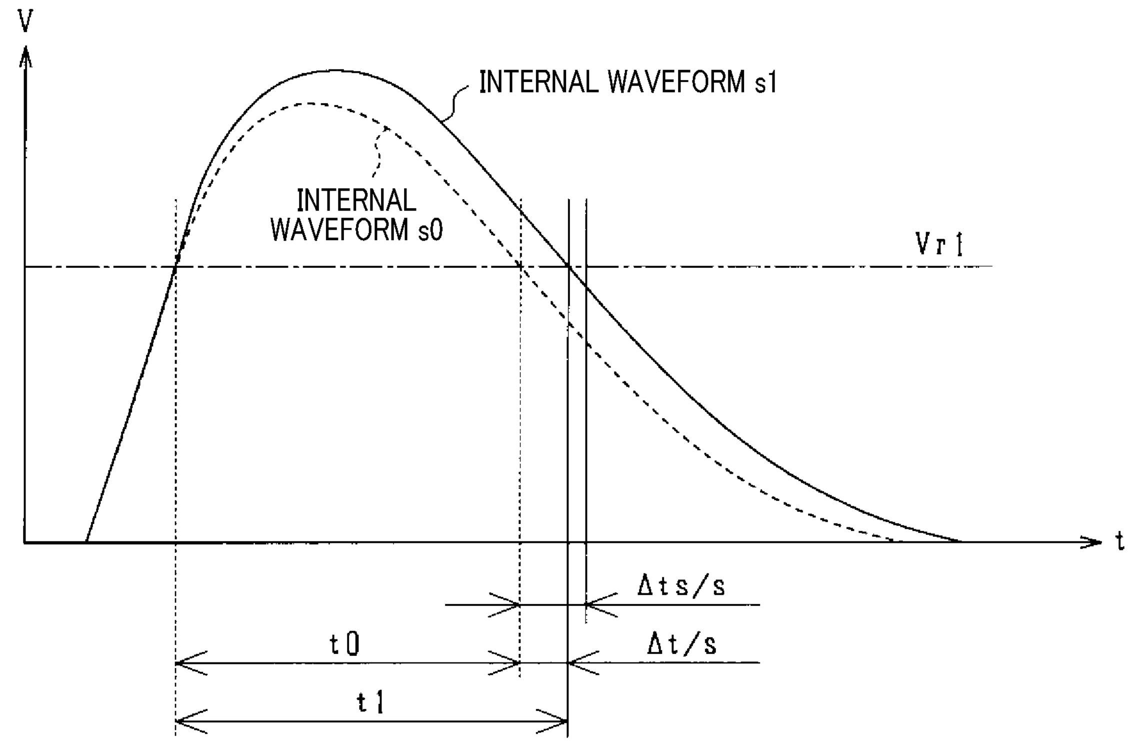
FIG. 10 is a graph exemplifying an internal light waveform acquired last time and an internal light waveform acquired currently in the normal state in a second embodiment.

FIG. 10 shows an example of internal waveform s0 at the first time and internal waveform s1 at the second time under normal conditions. The internal waveform s1 at the second time is larger than the internal waveform s0 at the first time, and the time from the first time to the second time is taken as the unit time in this example. The amount of changes Δt/s (absolute value of difference) provided between a pulse width t1 (second waveform width), which is the time exceeding the threshold value Vr1 of the internal light waveform s1 at the second time, and a pulse width t0 (first waveform width), which is the time exceeding the threshold value Vr1 of the light waveform s0 at the first time, is smaller than failure determination value Δts/s. Hence, the fault determination unit 23B determines that the electronic circuit is normal (not faulty).

In FIG. 10, a period of time from the first time to the second time is shown as a unit time, but such the period of time is not always limited to the period of time from the first time to the second time. Even in such a case, the amount of change per unit time Δt/s can be obtained by dividing the amount of change Δt between pulse width t0 and pulse width t1 by the period of time t from the first time to the second time.

Figure 11:
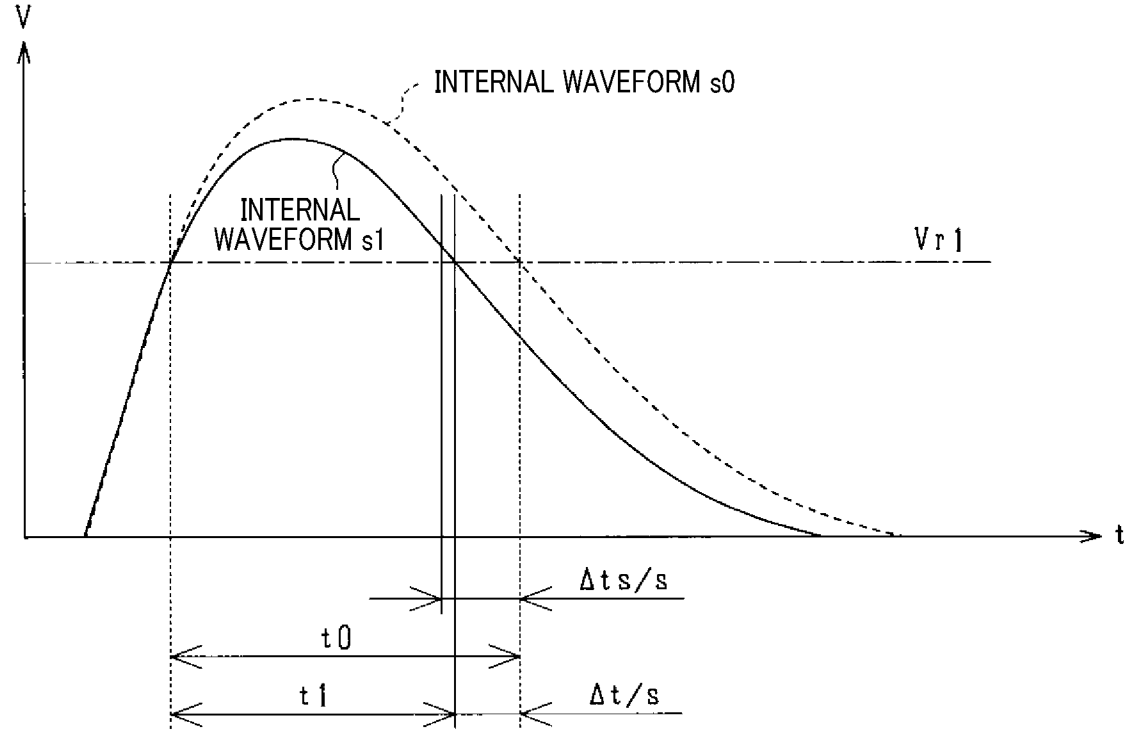
FIG. 11 is another graph exemplifying an internal light waveform acquired last time and an internal light waveform acquired currently in the normal state in the second embodiment.

FIG. 11 shows other examples of the internal light waveform s0 at the first time and the internal light waveform s1 at the second time under normal conditions. In this example, the internal waveform s1 at the second time is smaller than the internal waveform s0 at the first time. The amount of changes Δt/s provided between the pulse width t1 in internal waveform s1 at the second time and pulse width t0 in internal waveform s0 at the first time is smaller than the failure determination value Δts/s (i.e., an absolute value of difference). The amount of changes Δt/s between pulse width t1 in internal waveform s1 at the second time and pulse width t0 in internal waveform s0 at the first time is smaller than the failure determination value Δts/s (i.e., absolute value of difference). Therefore, the fault determination unit 23*b* determines that the electronic circuit is normal (not faulty).

Figure 12:
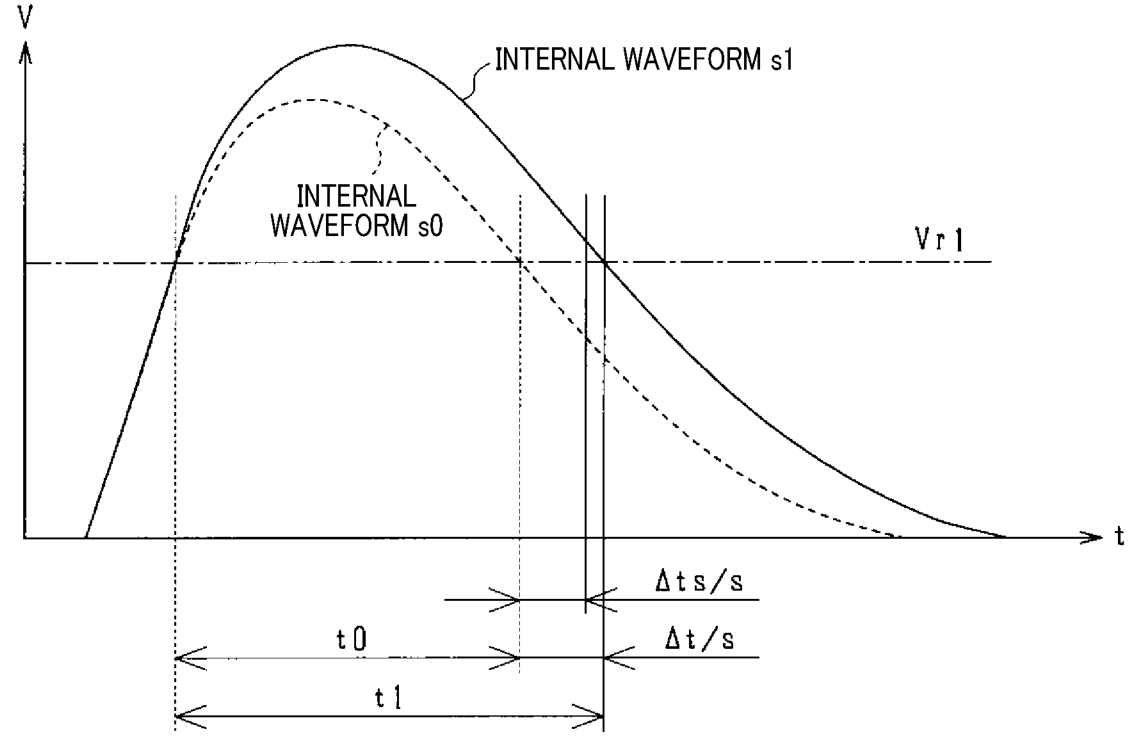
FIG. 12 is a graph exemplifying an internal light waveform acquired last time and an internal light waveform acquired currently in a failed state in the second embodiment.

FIG. 12 shows an example of the internal waveform s0 at the first time and the internal waveform s1 at the second time in a state where a failure has been caused. The internal waveform s1 at the second time is larger than the internal waveform s0 at the first time in this example. The amount of changes Δt/s between pulse width t1 in internal waveform s1 at the second time and pulse width t0 in internal waveform s0 at the first time is larger than the failure determination value Δts/s (absolute value of difference). Therefore, the fault determination unit 23*b* determines that the electronic circuit is faulty.

Figure 13:
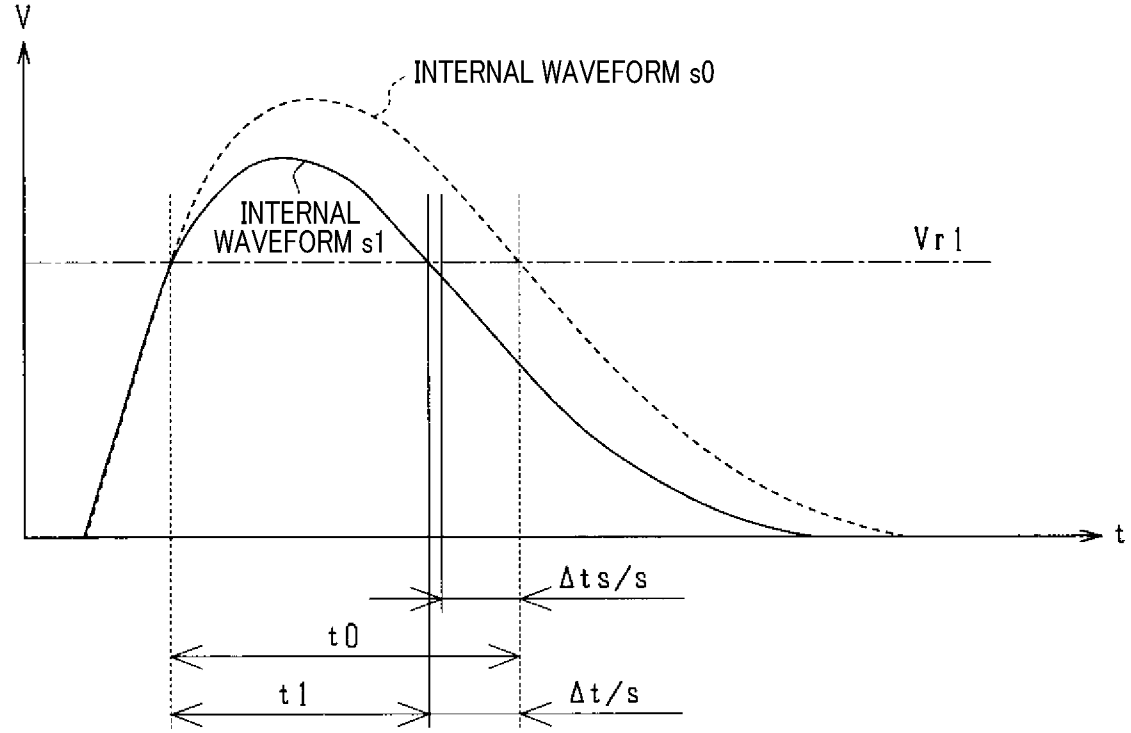
FIG. 13 is another graph exemplifying an internal light waveform acquired last time and an internal light waveform acquired currently in a failed state in the second embodiment.

FIG. 13 shows another example of the internal light waveform s0 at the first time and the internal light waveform s1 at the second time in a state where a failure has been caused. In this example, the internal waveform s1 at the second time is smaller than the internal waveform s0 at the first time. The amount of changes Δt/s between the pulse width t1 in the internal waveform s1 at the second time and the pulse width t0 in the internal light waveform s0 at the first time is larger than the failure determination value Δts/s (an absolute value of difference). Therefore, the fault determination unit 23*b* determines that the electronic circuit is faulty.

The above configuration also allows the use of the function to calculate pulse width t0 and t1, which is commonly provided by the TOF-based laser radar device 20.

The second embodiment may be implemented with the following modifications. The same or similar parts or components as or to those in the second embodiment will be omitted from the explanation with applying the same reference symbols.

The ratio of pulse width t1 to pulse width to (tilts) can be used as the amount of changes Δt/s between internal waveform s0 acquired in the first time and internal waveform s1 acquired in the second time. In this case, the failure determination value Δts/s should be changed according to the change in the amount of changes Δt/s to the ratio of pulse width t1 to pulse width to.

Instead of pulse width t0, which is the time when the intensity of an internal waveform s0 obtained in the first time exceeds threshold value Vr1, an area Sn−1 of the region bounded by the portion exceeding threshold value Vr1 and the threshold value Vr1 in the internal waveform s0 can also be adopted. Also, instead of the pulse width t1, which is the time when the intensity of internal waveform s1 acquired in second time exceeds the threshold value Vr1, an area Sn of the region bounded by both the portion exceeding the threshold value Vr1 and threshold value Vr1 in the internal waveform s1 can also be employed. Then, based on an amount of change provided between the area Sn and the area Sn−1 per unit time, ΔSn/s (degree of changes), it is possible to determine whether the electronic circuit is failed. In this case, the failure determination value ΔSs/s should be set according to the change per unit time on the areas Sn−1 and Sn, which is due to changes in temperature inside the casing of the laser radar device 20.

Third Embodiment

The third embodiment will now be described below with reference to FIGS. 14 to 17, with focusing on differences from the first embodiment. The same or equivalent components as or to those in the first embodiment will be omitted from the explanation, with still using the same reference numbers or symbols.

In the third embodiment, the fault determination unit 23*b* determines that an electronic circuit has failed based on the amount of changes Δvn between the wave height vn−1 (first wave height) of internal waveform n−1 obtained at the first time and the wave height vn (second wave height) of internal waveform n obtained at the second time. In this case, the failure determination value Δvs should be set according to the change in wave height vn−1 and vn, which is due to changes in temperature inside the casing of the laser radar device 20.

Figure 14:
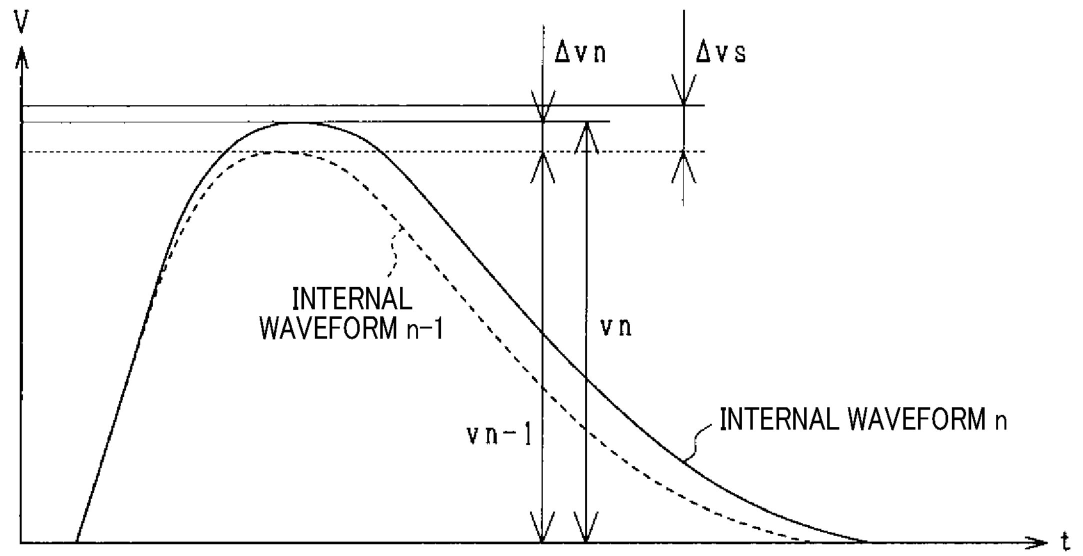
FIG. 14 is a graph exemplifying an internal light waveform acquired last time and an internal light waveform acquired currently in the normal state in a third embodiment.

FIG. 14 shows an example of the previous internal waveform n−1 and the current internal waveform n under normal conditions. In this example, the current internal waveform n is larger than the previous internal waveform n−1. The amount of changes Δvn provided between the wave height vn (second wave height) of the current internal waveform n and the wave height vn−1 (first wave height) of the previous internal waveform n−1 is smaller than failure determination value Δvs (absolute value of difference). Therefore, the fault determination unit 23*b* determines that the electronic circuit is normal (not faulty).

Figure 15:
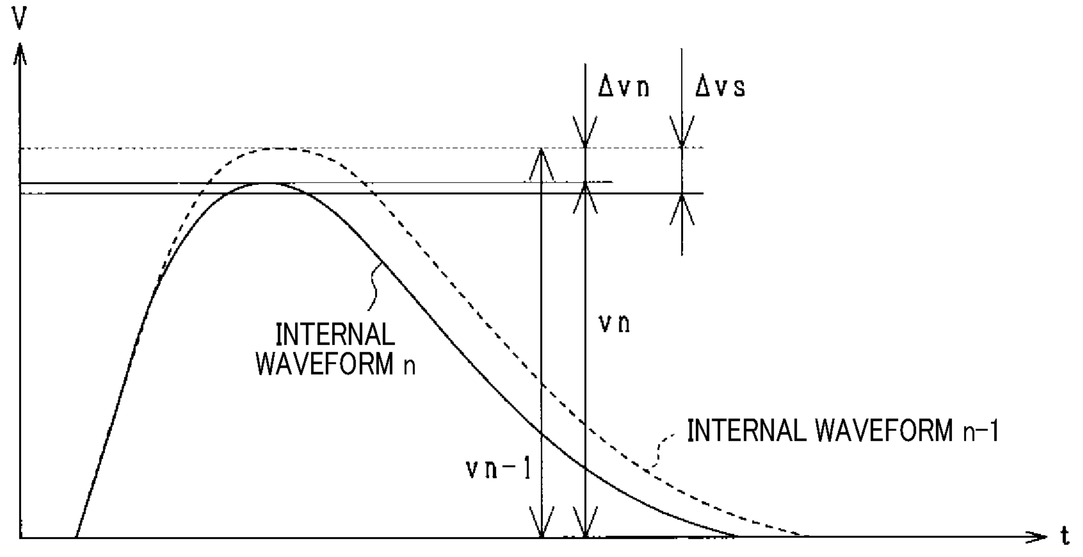
FIG. 15 is another graph exemplifying an internal light waveform acquired last time and an internal light waveform acquired currently in the normal state in the third embodiment.

FIG. 15 shows other examples of previous internal waveform n−1 and current internal waveform n under normal conditions. In this example, the current internal waveform n is smaller than the previous internal waveform n−1. The amount of changes Δvn (an absolute value of difference) provided between the wave height vn of the current internal waveform n and the wave height vn−1 of the previous internal waveform n−1 is smaller than the failure determination value Δvs. Therefore, the fault determination unit 23*b* determines that the electronic circuit is normal (not faulty).

Figure 16:
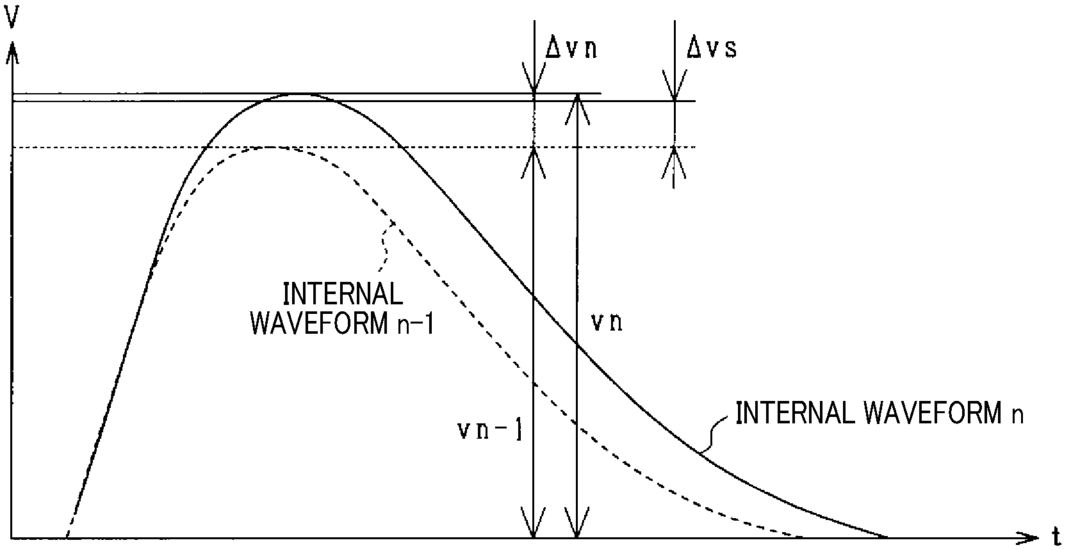
FIG. 16 is a graph exemplifying an internal light waveform acquired last time and an internal light waveform acquired currently in a failed state in the third embodiment.

FIG. 16 shows an example of the previous internal waveform n−1 and the current internal waveform n in a state where the failure has been caused. In this example, the current internal waveform n is larger than the previous internal waveform n−1. The amount of changes Δvn (an absolute value of difference) provided between the wave height vn of the current internal waveform n and the wave height vn−1 of the previous internal waveform n−1 is larger than the failure determination value Δvs. Therefore, the fault determination unit 23*b* determines that the electronic circuit is faulty.

Figure 17:
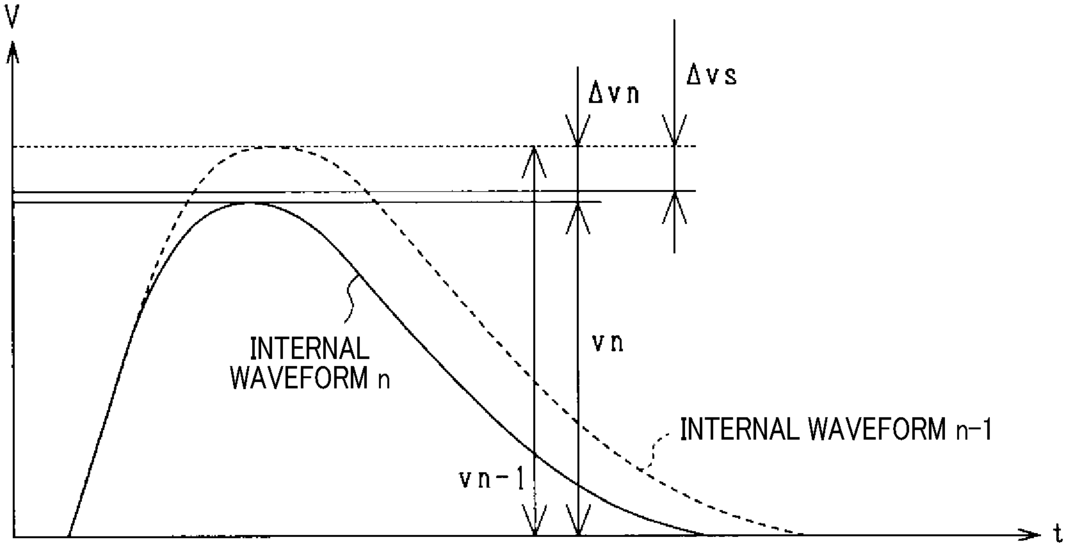
FIG. 17 is another graph exemplifying an internal light waveform acquired last time and an internal light waveform acquired currently in a failed state in the third embodiment.

FIG. 17 shows another example of previous internal waveform n−1 and current internal waveform n in a state where a failure has been caused. In this example, the current internal waveform n is smaller than the previous internal waveform n−1. The amount of changes Δvn (an absolute value of difference) provided between the wave height vn of the current internal waveform n and the wave height vn−1 of the previous internal waveform n−1 is larger than the failure determination value Δvs. Therefore, the fault determination unit 23*b* determines that the electronic circuit is faulty.

According to the above configuration, even when using the wave heights vn−1 and vn of the internal waveforms n−1 and n, it is possible to determine that an electronic circuit has failed by capturing the signs of a large change in the internal waveforms. Therefore, in the laser radar device 20, an electronic circuit failure can be detected quickly based on the internal waveforms n−1 and n.

The third embodiment may be implemented with the following modifications. The same or equivalent components as or to those in the third embodiment will be omitted from the explanation with the same reference numbers or symbols.

The ratio of wave height vn to wave height vn−1, (vn/vn−1), can be adopted as the amount of changes Δvn provided between internal waveform n−1 acquired at the first time and internal waveform n acquired at the second time. In this case, the failure determination value Δvs should be changed according to the change in the amount of changes Δvn to the ratio of wave height vn to wave height vn−1.

Instead of the wave height vn−1 of the internal waveform n−1 obtained at first time, an area Sn−1 (an integral value of the internal light waveform n−1) of the region bounded by both the internal waveform n−1 and the t axis can be adopted. The area Sn (integral value of the internal light waveform) of the region bounded by both the internal waveform n and the t-axis can be adopted instead of the wave height vn of the internal waveform n acquired at the second time. Based on the amount of changes ΔSn (degrees of change) provided between the area Sn and the area Sn−1, it can also be determined that an electronic circuit is failed. In this case, the failure determination value ΔSs should be set according to a change in the areas Sn−1 and Sn, which is due to changes in temperature inside the casing of the laser radar device 20.

Fourth Embodiment

A fourth embodiment will now be described below with reference to FIGS. 18 to 21, focusing on the differences from the first embodiment. The same or equivalent components as or to those in the first embodiment will be omitted from the explanation, with still using the same reference numbers or symbols.

In the fourth embodiment, via the processing shown in FIG. 3, the fault determination unit 23*b* is configured to determine a fault caused in the electronic circuit based on an amount of changes Δtrn provided between a first rise time trn−1 and a second rise time trn. The first rise time trn−1 is defined as a period of time (duration) starting from starting from an instant at which the reference received light waveform n−1 acquired at the first time exceeds in intensity a first threshold Vr1 to an instant at which the reference received light waveform reaches a second threshold Vr2. The second rise time trn is defined as a period of time (duration) starting from an instant at which the reference received light waveform n acquired at the second time exceeds in intensity the first threshold Vr1 to an instant at which the reference received light waveform n reaches the second threshold Vr2. In this case, the failure determination value Δtrs should be set according to the change in rise time trn−1 and trn due to changes in temperature inside the casing of the laser radar device 20.

Figure 18:
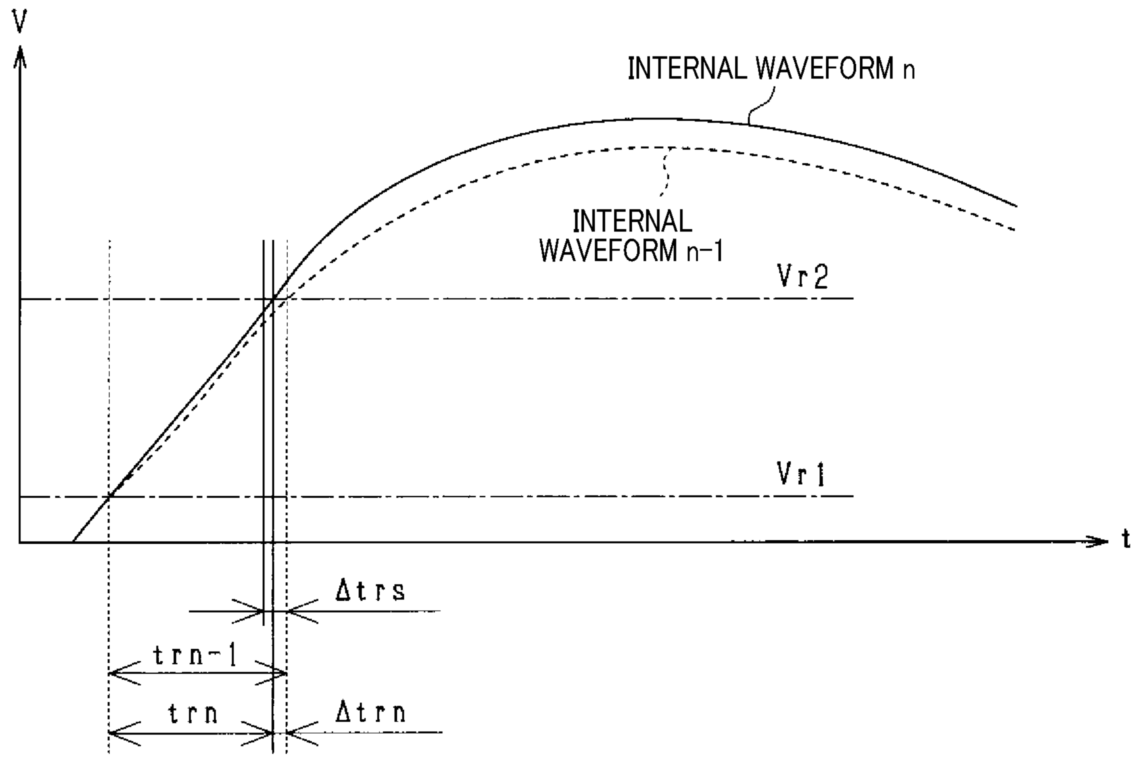
FIG. 18 is a graph exemplifying an internal light waveform acquired last time and an internal light waveform acquired currently in the normal state in a fourth embodiment.

FIG. 18 shows an example of the previous internal waveform n−1 and the current internal waveform n under normal conditions. The current internal waveform n is larger than the previous internal waveform n−1 in this example. The amount of changes Δtrn (an absolute value of difference) between rise time trn, which is the time from exceeding threshold value Vr1 to exceeding threshold value Vr2 in the current internal waveform n, and rise time trn−1, which is the time from exceeding threshold value Vr1 to exceeding threshold value Vr2 in the previous internal waveform n−1, is smaller than failure determination value Δtrs. Therefore, the fault determination unit 23*b* determines that the electronic circuit is normal (not faulty).

Figure 19:
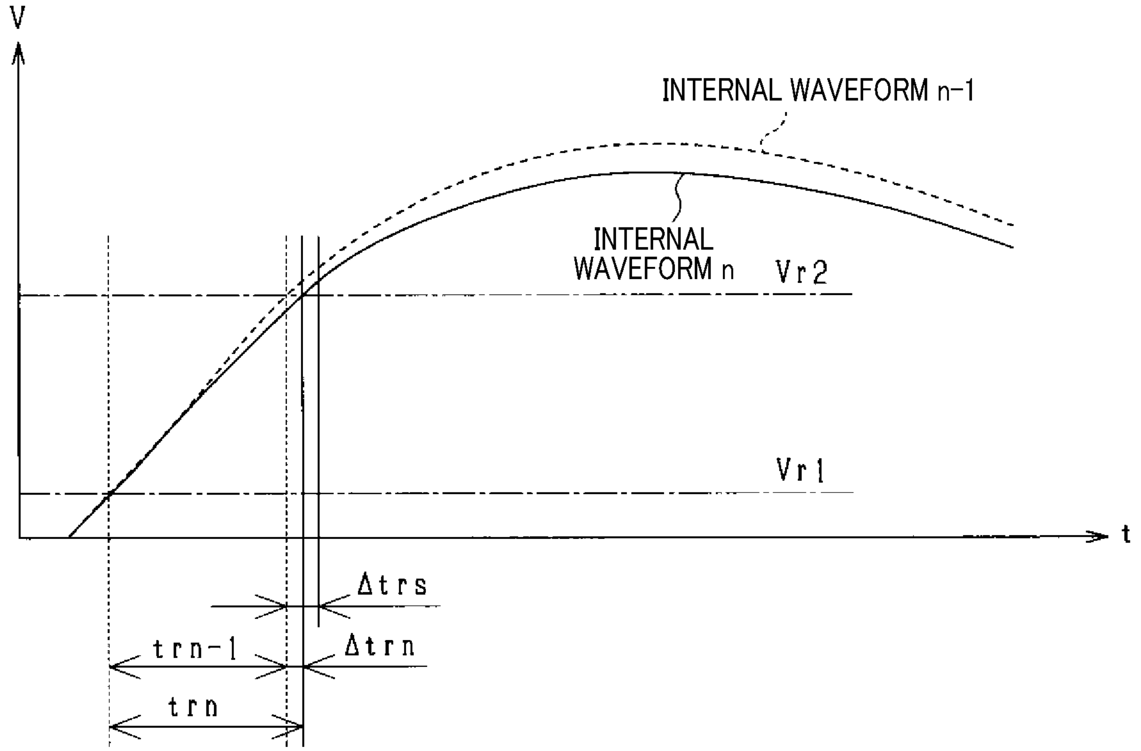
FIG. 19 is another graph exemplifying an internal light waveform acquired last time and an internal light waveform acquired currently in the normal state in the fourth embodiment.

FIG. 19 shows other examples of previous internal waveform n−1 and current internal waveform n under normal conditions. In this example, the current internal waveform n is smaller than the previous internal waveform n−1. The amount of changes Δtrn (an absolute value of difference) between rise time trn, which is the time from exceeding threshold value Vr1 to exceeding threshold value Vr2 in the current internal waveform n, and rise time trn−1, which is the time from exceeding threshold value Vr1 to exceeding threshold value Vr2 in the previous internal waveform n−1, is smaller than failure determination value Δtrs. Therefore, the fault determination unit 23*b* determines that the electronic circuit is normal (not faulty).

Figure 20:
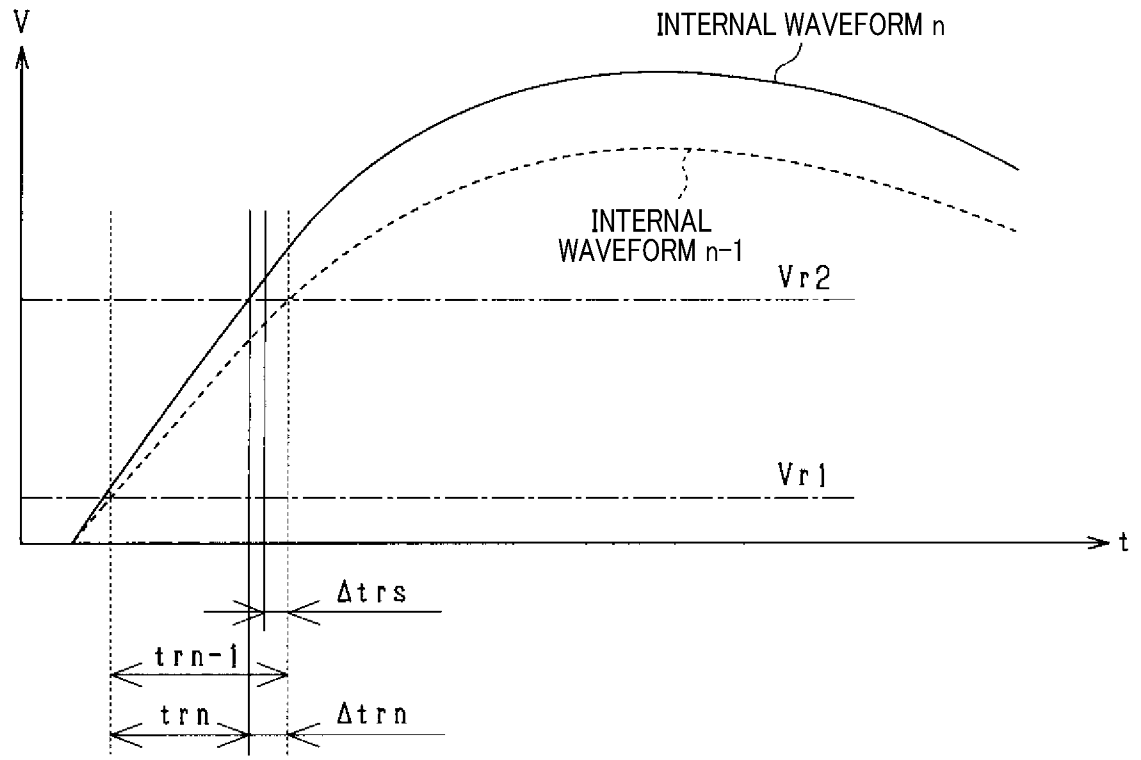
FIG. 20 is a graph exemplifying an internal light waveform acquired last time and an internal light waveform acquired currently in a failed state in the fourth embodiment.

FIG. 20 shows an example of the previous internal waveform n−1 and the current internal waveform n in a state where a failure has been caused. The current internal waveform n is larger than the previous internal waveform n−1 in this example. The amount of changes Δtrn (absolute value of difference) between rise time trn, which is the time from exceeding threshold value Vr1 to exceeding threshold value Vr2 in the current internal waveform n, and rise time trn−1, which is the time from exceeding threshold value Vr1 to exceeding threshold value Vr2 in the previous internal waveform n−1, is larger than failure determination value Δtrs. Therefore, the fault determination unit 23*b* determines that the electronic circuit is faulty.

Figure 21:
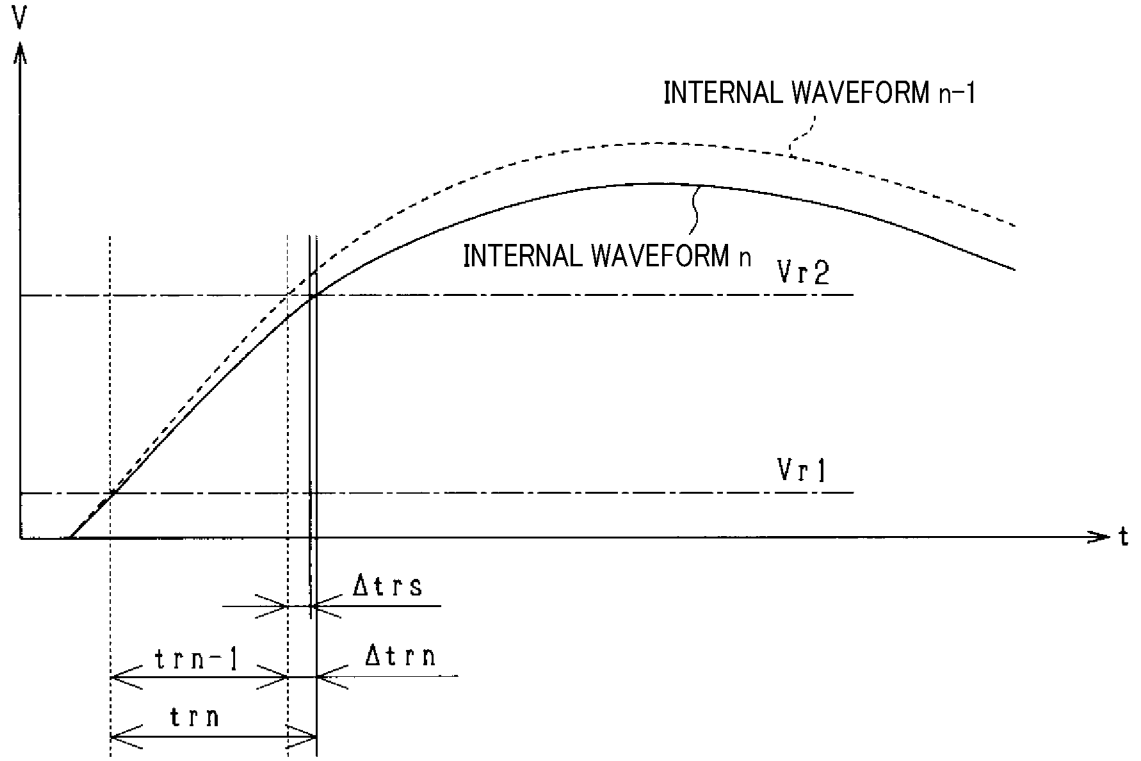
FIG. 21 is another graph exemplifying an internal light waveform acquired last time and an internal light waveform acquired currently in a failed state in the fourth embodiment.

FIG. 21 shows another example of the previous internal waveform n−1 and the current internal waveform n in a state where a failure has been caused. In this example, the current internal waveform n is smaller than the previous internal waveform n−1. The amount of changes Δtrn (an absolute value of difference) between rise time trn, which is the time from exceeding threshold value Vr1 to exceeding threshold value Vr2 in the current internal waveform n, and rise time trn−1, which is the time from exceeding threshold value Vr1 to exceeding threshold value Vr2 in the previous internal waveform n−1, is larger than failure determination value Δtrs. Therefore, the fault determination unit 23*b* determines that the electronic circuit is faulty.

The above configuration also makes it possible to determine that an electronic circuit has failed by capturing the signs of a large change in the internal waveforms n−1 and n. Therefore, in the laser radar device 20, electronic circuit failures can be detected quickly based on internal light waveforms n−1 and n.

The fourth embodiment may be implemented with the following modifications. The same or equivalent components as or to those in the fourth embodiment will be omitted from the explanation with the same reference numbers or symbols.

The ratio of rise time trn to rise time trn−1 (trn/trn−1) can be adopted as the amount of changes Δtrn between internal waveform n−1 acquired at the first time and internal waveform n acquired at the second time. In this case, the failure determination value Δtrs should be changed according to the change in the amount of changes Δtrn to the ratio between rise time trn and rise time trn−1.

Instead of rise time trn−1 obtained at first time, the area Sn−1 of the region bounded by threshold value Vr1 and the portion from exceeding threshold value Vr1 to exceeding threshold value Vr2 in internal waveform n−1 can be adopted. Instead of the rise time trn obtained in the second time, the area Sn of the region bounded by the portion from exceeding threshold value Vr1 to exceeding threshold value Vr2 and threshold value Vr1 in the internal waveform n can be adopted. Based on the amount of changes ΔSn (degree of changes) between area Sn and area Sn−1, it can be determined that the electronic circuit has failed. In this case, the failure determination value ΔSs should be set according to the change in area Sn−1 and Sn due to changes in temperature inside the casing of the laser radar device 20.

Fifth Embodiment

A fifth embodiment will now be described below with reference to FIGS. 22 to 25, with focusing on differences from the first embodiment. The same or equivalent components to as or to those in the first embodiment will be omitted from the explanation with the same reference numbers or symbols.

In the fifth embodiment, the fault determination unit 23*b* is configured to determine that an electronic circuit has failed based on the amount of changes Δtfn between the fall time tfn−1 (first fall time) and the fall time tfn (second fall time). The fall time tfn−1 is the time from when the intensity of the internal waveform n−1 acquired in the first time falls below threshold value Vr2 (second threshold) to when it falls below threshold value Vr1 (first threshold). There is a relationship Vr2>Vr1. The fall time tfn is the time from when the intensity of the internal waveform n acquired in the second time falls below threshold value Vr2 to when it falls below threshold value Vr1. In this case, the failure determination value Δtfs should be set according to the change in fall time tfn−1, tfn due to changes in temperature inside the casing of the laser radar device 20.

Figure 22:
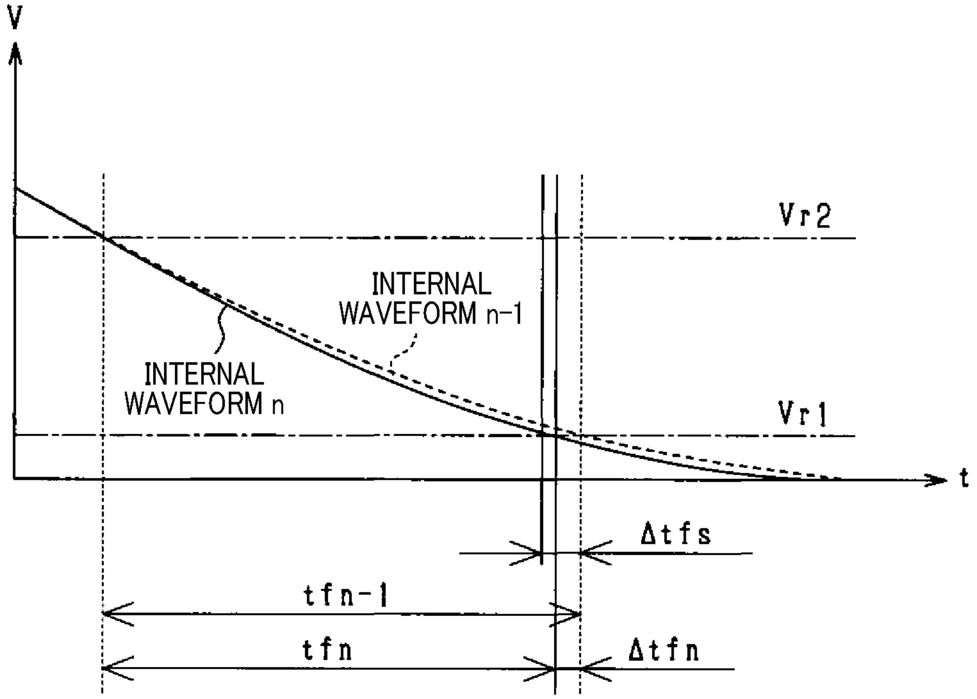
FIG. 22 is a graph exemplifying an internal light waveform acquired last time and an internal light waveform acquired currently in the normal state in a fifth embodiment.

FIG. 22 shows an example of the previous internal waveform n−1 and the current light waveform n under normal conditions. In this example, the current internal waveform n is smaller than the previous internal waveform n−1 in the falling part. The amount of changes Δtfn (absolute value of difference) between the fall time tfn, which is the time from below threshold value Vr2 to below threshold value Vr1 in the current internal waveform n, and the fall time tfn−1, which is the time from below threshold value Vr2 to below threshold value Vr1 in the previous internal waveform n−1, is smaller than failure determination value Δtfs. Therefore, the fault determination unit 23*b* determines that the electronic circuit is normal (not faulty).

Figure 23:
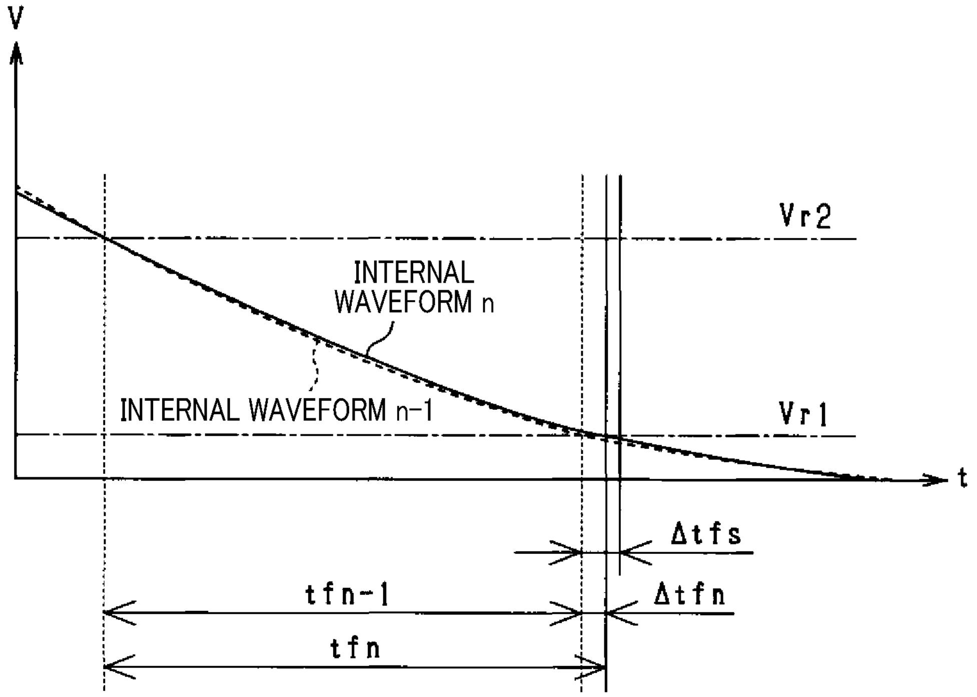
FIG. 23 is another graph exemplifying an internal light waveform acquired last time and an internal light waveform acquired currently in the normal state in the fifth embodiment.

FIG. 23 shows other examples of previous internal waveform n−1 and current internal waveform n under normal conditions. In this example, the current internal waveform n is larger than the previous internal waveform n−1 in the falling part. The amount of changes Δtfn (absolute value of difference) between the fall time tfn, which is the time from below threshold value Vr2 to below threshold value Vr1 in the current internal waveform n, and the fall time tfn−1, which is the time from below threshold value Vr2 to below threshold value Vr1 in the previous internal waveform n−1, is smaller than failure determination value Δtfs. Therefore, the fault determination unit 23*b* determines that the electronic circuit is normal (not faulty).

Figure 24:
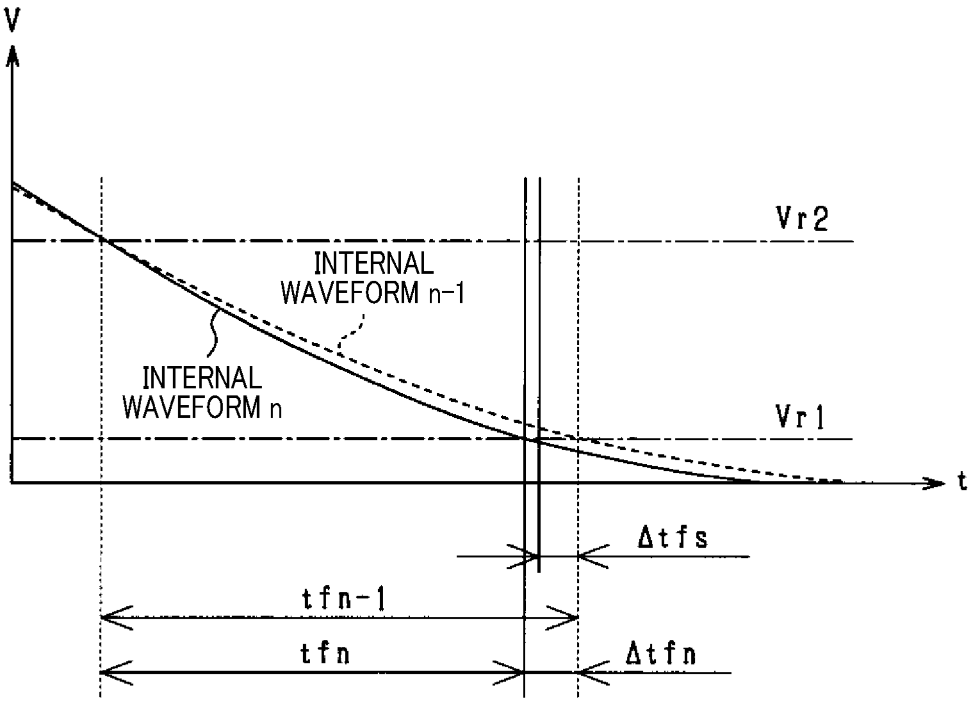
FIG. 24 is a graph exemplifying an internal light waveform acquired last time and an internal light waveform acquired currently in a failed state in the fifth embodiment.

FIG. 24 shows an example of the previous internal waveform n−1 and the current internal waveform n in a state where a failure has been caused. In this example, the current internal waveform n is smaller than the previous internal waveform n−1 in the falling part. The amount of changes Δtfn (absolute value of difference) between the fall time tfn, which is the time from below threshold value Vr2 to below threshold value Vr1 in the current internal waveform n, and the fall time tfn−1, which is the time from below threshold value Vr2 to below threshold value Vr1 in the previous internal waveform n−1, is larger than failure determination value Δtfs. Therefore, the fault determination unit 23*b* determines that the electronic circuit is faulty.

Figure 25:
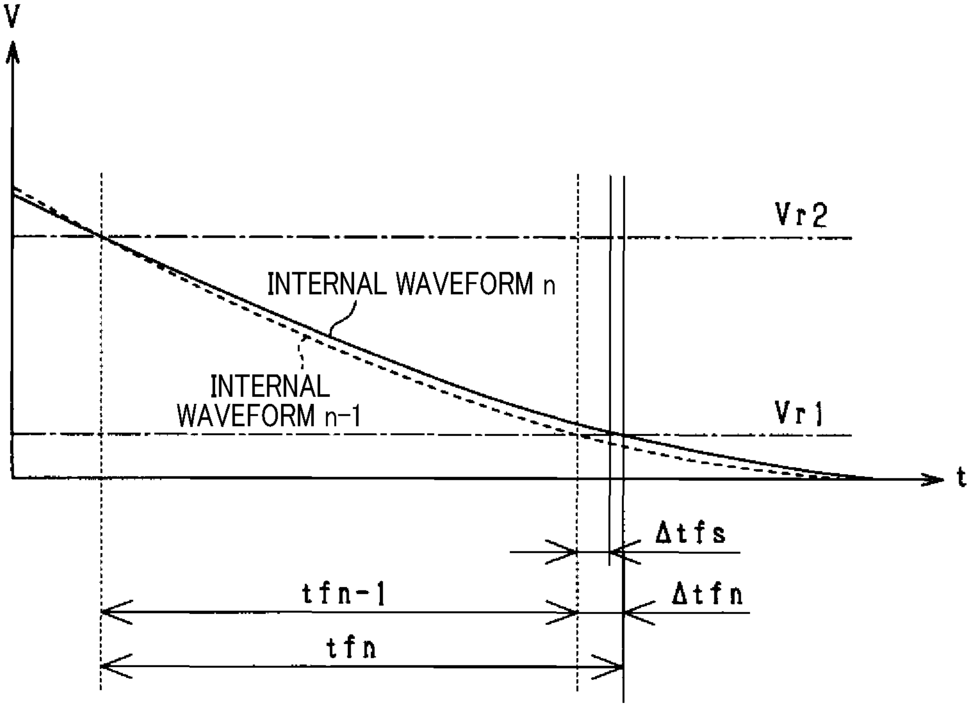
FIG. 25 is another graph exemplifying an internal light waveform acquired last time and an internal light waveform acquired currently in a failed state in the fifth embodiment.

FIG. 25 shows another example of the previous internal waveform n−1 and the current internal waveform n in a state where a failure has been caused. In this example, the current internal waveform n is larger than the previous internal waveform n−1 in the falling part. The amount of changes Δtfn (an absolute value of difference) between the fall time tfn, which is the time from below threshold value Vr2 to below threshold value Vr1 in the current internal waveform n, and the fall time tfn−1, which is the time from below threshold value Vr2 to below threshold value Vr1 in the previous internal waveform n−1, is larger than failure determination value Δtfs. Therefore, the fault determination unit 23*b* determines that the electronic circuit is faulty.

The above configuration also makes it possible to determine that an electronic circuit has failed by capturing the signs of a large change in the internal waveforms n−1 and n. Therefore, in the laser radar device 20, electronic circuit failures can be detected quickly based on internal waveforms n−1 and n.

The fifth embodiment may be implemented with the following modifications. The same or equivalent components as or to those in the fifth embodiment will be omitted from the explanation by applying the same reference numbers or symbols.

The ratio of the fall time tfn to the fall time tfn−1 (tfn/tfn−1) can be adopted as the amount of changes Δtfn between the internal waveform n−1 acquired in the first time and the internal waveform n acquired in the second time. In this case, the failure determination value Δtfs should be changed according to the change in the amount of changes Δtfn to the ratio of the fall time tfn to the fall time tfn−1.

Instead of the fall time tfn−1 obtained for the first time, the area Sn−1 of the region bounded by threshold value Vr1 and the area from below threshold value Vr2 to below threshold value Vr1 in the internal waveform n−1 can also be adopted. Instead of the fall time tfn obtained for the second time, the area Sn of the region bounded by threshold value Vr1 and the area from below threshold value Vr2 to below threshold value Vr1 in the internal waveform n can also be adopted. Based on the amount of changes ΔSn (degree of changes) between area Sn and area Sn−1, it can be determined that the electronic circuit has failed. In this case, the failure determination value ΔSs should be set according to the changes in the area Sn−1 and Sn in the casing inside the laser radar device 20 due to changes in temperature.

The first to fifth embodiments may be implemented with the following modifications. The same or equivalent components as or to those in the first to fifth embodiments will be omitted from the explanation by applying the same reference numbers or symbols.

As a modification, the fault determination unit 23*b* can be configured such that the unit 23*b* calculates an amount of changes Δtt provided between an internal light waveform acquired at the first time and an internal light waveform acquired at the second time. And the unit 23*b* checks whether the amount of changes Δtt exceeds an amount of changes Δttn, which amount is set by considering an amount of changes in the light internal waveforms which is caused by changes in the temperature inside the device casing in a period of time immediately after the laser radar device 20 is tuned on or a period of time provided after a lapse of time from turning on the laser radar device 20. Such a configuration can improve the accuracy of electronic circuit failure determination at each time period after the laser radar device 20 is turned on.

The fault determination unit 23*b* can also determine that an electronic circuit has failed if the amount of changes Δtt between internal waveform obtained at the first time and internal waveform obtained at the second time exceeds the amount of changes Δttn determined as follows. This amount of changes Δttn is the amount of changes assumed as the amount of changes in the internal waveform due to changes in temperature inside the casing at a predetermined time after the idle period has elapsed since the laser radar device 20 was turned on. In this case, the electronic circuit failure determination should not be performed in the idle period. According to this configuration, it is not necessary to change the failure determination value according to the time of the failure determination, and the determination process can be simplified. Furthermore, it can improve the accuracy of determining electronic circuit failures later than the idle period.

The light projector 21 may project a laser beam toward the reference optical member 25 every n revolutions of the motor (i.e., every n times the scan cycle Tsc). The fault determination unit 23*b* may then perform electronic circuit fault determination every n times the scan cycle Tsc. In this case, the light projector 21 should also project a laser beam toward the detection area AR every time the motor makes one rotation (every scan cycle Tsc).

When the internal waveform changes due to changes in temperature in the electronic circuit, the reference distance DO to the reference optical member 25 calculated by the distance calculator 23*a* changes. Therefore, the fault determination unit 23*b* can also determine that an electronic circuit has failed based on the amount of changes ΔD0 (degree of changes) between reference distance D0 acquired at the first time and reference distance D0 acquired at the second time after the first time. Such a configuration allows rapid detection of electronic circuit failures by using the function to calculate the distance to the object, which is commonly provided by TOF-based laser radar device 20. In this case, the fault determination unit 23*b* can also determine that an electronic circuit has failed based on the amount of changes Δtn provided between the internal waveform n−1 acquired at the first time and reference the internal waveform n acquired at the second time after the first time.

The reference optical member 25 may be fixed (installed) at a predetermined position (fixed location) outside the casing of the laser radar device 20, as long as the position can avoid the effects of rain, dust, etc.

Each of the above modifications may be implemented in combination to the extent possible.

DESCRIPTION OF PARTIAL REFERENCE SIGNS

20 . . . laser radar device
21 . . . light projector
22 . . . light receiver
23 . . . microcomputer
23*a* . . . distance calculator (detection unit)
23*b* . . . fault determination unit (determination unit)
25 . . . reference optical member
AR . . . detection area (such as danger zone)
S1 obtaining unit functionally realized
S2 calculation unit functionally realized
S3 determination unit functionally realized

What is claimed is:

1. A laser radar device, comprising:
a light projector that projects a laser beam to both a detection area which is present outside the laser radar device and a reference optical member located at a fixed position;
a light receiver that receives a reflected light of the laser beam projected from the light projector, converts the reflected light to, as an electric signal, a received light waveform, and outputs the received light waveform;
a detection unit configured to detect an object based on the received light waveform outputted from the light receiver;
an obtaining unit configured to obtain an electrical reference received light waveform which is outputted from the light receiver by making the light projector project the laser beam to the reference optical member, at a first time and a second time elapsing from the first time;
a calculation unit configured to calculate a degree of changes between the reference received light waveforms acquired by the obtaining unit at the first and second times; and
a determination unit configured to determine that at least one of the light projector, the light receiver, and the detection unit fails, based on the degree of changes obtained by the calculation unit, wherein the degree of changes is defined as an amount of changes per unit time provided between first and second waveform widths, the first waveform width being a duration during which the reference received light waveform acquired at the first time exceeds in intensity a first threshold, the second waveform width being a duration during which the reference received light waveform acquired at the second time exceeds in intensity the first threshold.

2. The laser radar device according to claim 1, wherein the light projector is configured to project, at a predetermined cycle, toward both the reference optical member and the detection area, and an interval between the first and second times corresponds to the predetermined cycle.

3. The laser radar device according to claim 1, wherein the reference optical member is located at the fixed position inside the laser radar device.

4. A laser radar device, comprising:

a light projector that projects a laser beam to both a detection area which is present outside the laser radar device and a reference optical member located at a fixed position;

a light receiver that receives a reflected light of the laser beam projected from the light projector, converts the reflected light to, as an electric signal, a received light waveform, and outputs the received light waveform;

a detection unit configured to detect an object based on the received light waveform outputted from the light receiver;

an obtaining unit configured to obtain an electrical reference received light waveform which is outputted from the light receiver by making the light projector project the laser beam to the reference optical member, at a first time and a second time elapsing from the first time;

a calculation unit configured to calculate a degree of changes between the reference received light waveforms acquired by the obtaining unit at the first and second times; and a determination unit configured to determine that at least one of the light projector, the light receiver, and the detection unit fails, based on the degree of changes obtained by the calculating unit, wherein the degree of changes is defined as an amount of changes provided between first and second rise durations, the first rise duration starting from an instant at which the reference received light waveform acquired at the first time exceeds in intensity a first threshold to an instant at which the reference received light waveform reaches a second threshold, the second rise duration starting from an instant at which the reference received light waveform acquired at the second time exceeds in intensity the first threshold to an instant at which the reference received light waveform reaches the second threshold.

5. The laser radar device according to claim 4, wherein the light projector is configured to project, at a predetermined cycle, toward both the reference optical member and the detection area, and an interval between the first and second times corresponds to the predetermined cycle.

6. A laser radar device comprising:

a light projector that projects a laser beam to both a detection area which is present outside the laser radar device and a reference optical member located at a fixed position;

a light receiver that receives a reflected light of the laser beam projected from the light projector, converts the reflected light to, as an electric signal, a received light waveform, and outputs the received light waveform;

a detection unit configured to detect an object based on the received light waveform outputted from the light receiver;

an obtaining unit configured to obtain an electrical reference received light waveform which is outputted from the light receiver by making the light projector project the laser beam to the reference optical member, at a first time and a second time elapsing from the first time;

a calculation unit configured to calculate a degree of changes between the reference received light waveforms acquired by the obtaining unit at the first and second times; and a determination unit configured to determine that at least one of the light projector, the light receiver, and the detection unit fails, based on the degree of changes obtained by the calculation unit, wherein the degree of changes is defined as an amount of changes provided between first and second falling durations, the first falling duration starting from an instant at which the reference received light waveform acquired at the first time first becomes in intensity below a second threshold to an instant at which the reference received light waveform then becomes below a first threshold, the second falling duration starting from an instant at which the reference received light waveform acquired at the second time first becomes in intensity below the second threshold to an instant at which the reference received light waveform then becomes below the first threshold.

7. The laser radar device according to claim 6, wherein the light projector is configured to project, at a predetermined cycle, toward both the reference optical member and the detection area, and an interval between the first and second times corresponds to the predetermined cycle.

8. A laser radar device, comprising:

a light projector that projects a laser beam to both a detection area which is present outside the laser radar device and a reference optical member located at a fixed position;

a light receiver that receives a reflected light of the laser beam projected from the light projector converts the reflected light to, as an electric signal, a received light waveform, and outputs the received light waveform;

a detection unit configured to detect an object based on the received light waveform outputted from the light receiver;

an obtaining unit configured to obtain an electrical reference received light waveform which is outputted from the light receiver by making the light projector project the laser beam to the reference optical member, at a first time and a second time elapsing from the first time;

a calculation unit configured to calculate a degree of changes between the reference received light waveforms acquired by the obtaining unit at the first and second times; and a determination unit configured to determine that at least one of the light projector, the light receiver, and the detection unit fails, based on the degree of changes obtained by the calculating unit, wherein the light projector is configured to project, at a predetermined cycle, toward both the reference optical member and the detection area, and an interval between the first and second times corresponds to the predetermined cycle, and wherein the degree of changes is defined as an amount of changes provided between first and second wave heights, the first wave height being a wave height of the reference received light waveform acquired at the first time, the second wave height being a wave height of the reference receive light wave acquired at the second time.

9. A laser radar device, comprising:

a light projector that projects a laser beam to both a detection area which is present outside the laser radar device and a reference optical member located at a fixed position inside the laser radar device, the light projector being configured to project, at a predetermined cycle, toward both the reference optical member and the detection area;

a light receiver that receives a reflected light of the laser beam projected from the light projector, converts the reflected light to, as an electric signal, a received light waveform, and outputs the received light waveform; and a processor, incorporated in a computer system installed in the laser radar device, the processer reading a previously set program from a memory in the computer system and enabling the computer system to:

detect an object based on the received light waveform outputted from the light receiver;

obtain an electrical reference received light waveform which is outputted from the light receiver by making the light projector project the laser beam to the reference optical member, at a first time and a second time elapsing from the first time, an interval between the first and second times corresponding to the predetermined cycle;

calculate a degree of changes between the reference received light waveforms acquired at the first and second times, the degree of changes being defined as an amount of changes per unit time provided between first and second waveform widths, the first waveform width being a duration during which the reference received light waveform acquired at the first time exceeds in intensity a first threshold, the second waveform width being a duration during which the reference received light waveform acquired at the second time exceeds in intensity the first threshold; and determine that at least one of the light projector, the light receiver, and the detection unit fails, based on the degree of changes obtained.

10. A method of detecting a failure caused in a laser radar device, the laser radar device comprising:

a light projector that projects a laser beam to both a detection area which is present outside the laser radar device and a reference optical member located at a fixed position inside the laser radar device, the light projector being configured to project, at a predetermined cycle, toward both the reference optical member and the detection area;

a light receiver that receives a reflected light of the laser beam projected from the light projector, converts the reflected light to, as an electric signal, a received light waveform, and outputs the received light waveform; and a processor, incorporated in a computer system installed in the laser radar device, the processer reading a previously set program from a memory in the computer system and enabling the computer system to perform the method of steps of:

detecting an object based on the received light waveform outputted from the light receiver;

obtaining an electrical reference received light waveform which is outputted from the light receiver by making the light projector project the laser beam to the reference optical member, at a first time and a second time elapsing from the first time, an interval between the first and second times corresponding to the predetermined cycle;

calculating a degree of changes between the reference received light waveforms acquired at the first and second times the degree of changes being defined as an amount of changes per unit time provided between first and second waveform widths, the first waveform width being a duration during which the reference received light waveform acquired at the first time exceeds in intensity a first threshold, the second waveform width being a duration during which the reference received light waveform acquired at the second time exceeds in intensity the first threshold; and determining that at least one of the light projector, the light receiver, and the detection unit fails, based on the degree of changes obtained.

* * * * *